United States Patent [19]
Curtis

[11] Patent Number: 5,459,713
[45] Date of Patent: Oct. 17, 1995

[54] SELF-CONFIGURING DATA COMMUNICATION SYSTEM AND METHOD

[75] Inventor: Robert A. Curtis, Hudson, Mass.

[73] Assignee: Digital Equipment Corporation, Maynard, Mass.

[21] Appl. No.: 270,092

[22] Filed: Jul. 1, 1994

Related U.S. Application Data

[63] Continuation of Ser. No. 705,571, May 24, 1991, abandoned.

[51] Int. Cl.⁶ .............................. H04L 12/26; H04L 12/46
[52] U.S. Cl. .............................. 370/13; 370/17; 370/94.1; 370/85.9
[58] Field of Search .................................. 370/13, 16, 17, 370/60, 54, 85.9, 85.11, 85.12, 85.13, 85.14, 94.1; 371/8.2

[56] References Cited

U.S. PATENT DOCUMENTS

| | | | |
|---|---|---|---|
| 4,063,220 | 12/1977 | Metcalfe et al. | 340/346 |
| 4,099,024 | 7/1978 | Boggs et al. . | |
| 4,481,626 | 11/1984 | Boggs et al. | 340/625.5 |
| 4,597,078 | 6/1986 | Kempf | 370/85.13 |
| 4,627,052 | 12/1986 | Hoare et al. | 370/85.13 |
| 4,638,311 | 1/1987 | Gerety | 370/85.2 X |
| 4,644,348 | 2/1987 | Gerety | 340/825.51 X |
| 4,647,912 | 3/1987 | Bates et al. | 340/825.5 |
| 4,847,837 | 7/1989 | Morales et al. | 371/8 |
| 4,905,227 | 2/1990 | Leohner et al. | 370/85.9 |
| 4,933,937 | 6/1990 | Konishi | 370/85.13 |
| 5,079,760 | 1/1992 | Nemirovsky et al. | 370/17 |
| 5,101,402 | 3/1992 | Chin et al. | 370/17 |

FOREIGN PATENT DOCUMENTS 183998  6/1986  European Pat. Off. .

OTHER PUBLICATIONS

Computer Communication Review, vol. 19, No. 4, Sep. 1989, New York, NY, USA, pp. 170–181, P. K. McKinley, et al, "Group Communication in Multichannel Networks with Staircase Interconnection Topologies".

Primary Examiner—Melvin Marcelo
Attorney, Agent, or Firm—Christine M. Kuta; A. Sidney Johnston; Arthur W. Fisher

[57] ABSTRACT

A controller for a communication system having a plurality of networks and a plurality of stations communicating with each other by sending messages from a source station to a destination station is disclosed. A plurality of stations may be assigned to a group. A communication history for the stations is determined, where the history corresponds to the messages communicated. The stations are connected into a common network in accordance with the communication history. The communication history corrresponds to a series of packets and is based on a source address and a destination address of each of the packets. A station may have a matrix, the matrix having rows indexed by source system address and columns indexed by destination system address, for storing a value indicating a quantity of information transferred from each station to each other station.

19 Claims, 19 Drawing Sheets

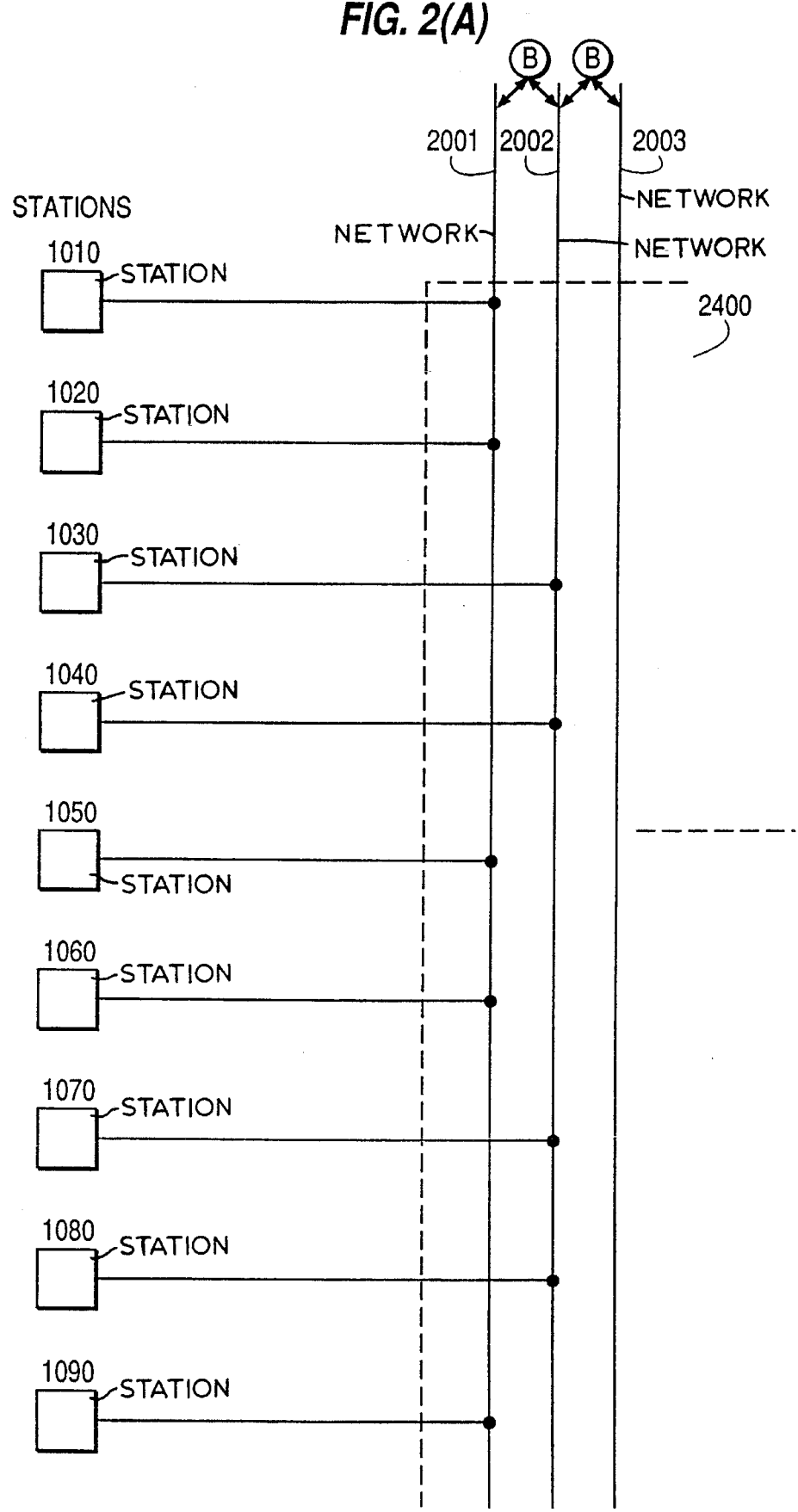

FIG. 12

|        | DESTINATION |   |   |   |   |   |   |   |   |   |    |    |    |    |    |    |    |
|--------|---|---|---|---|---|---|---|---|---|---|----|----|----|----|----|----|----|
|        | 0 | 1 | 2 | 3 | 4 | 5 | 6 | 7 | 8 | 9 | 10 | 11 | 12 | 13 | 14 | 15 | 16 |
| 0      |   |   |   |   |   |   |   |   |   |   |    |    |    |    |    |    |    |
| 1      |   |   |   | 2 |   |   |   |   |   |   |    |    |    |    |    |    |    |
| 2      |   |   |   |   |   |   |   | 3 |   |   |    |    |    |    |    |    |    |
| 3      | 1 |   |   |   |   |   || 1 |   |   |   |    |    |    |    |    |    |    |
| 4      |   |   |   |   |   |   |   | 4 |   |   |    |    |    |    |    |    |    |
| 5      |   |   |   |   |   |   |   | 7 |   |   |    |    |    |    |    |    |    |
| 6      |   |   |   | 1 |   |   |   |   |   |   |    |    |    |    |    |    |    |
| 7      |   |   | 3 |   | 3 | 8 |   |   |   |   |    |    |    |    |    |    |    |
| 8      |   |   |   |   |   |   |   |   |   |   |    |    |    |    |    |    |    |
| 9      |   |   |   |   |   |   |   |   |   |   |    |    |    |    |    |    |    |
| 10     |   |   |   |   |   |   |   |   |   |   |    |    |    |    |    |    |    |
| 11     |   |   |   |   |   |   | 12000 |   |   |   |    |    |    |    |    |    |    |
| 12     |   |   |   |   |   |   |   |   |   |   |    |    |    |    |    |    |    |
| 13     |   |   |   |   |   |   |   |   |   |   |    |    |    |    |    |    |    |
| 14     |   |   |   |   |   |   |   |   |   |   |    |    |    |    |    |    |    |
| 15     |   |   |   |   |   |   |   |   |   |   |    |    |    |    |    |    |    |
| 16     |   | 1 | 1 | 2 | 1 | 1 | 1 | 3 |   |   |    |    |    |    |    |    |    |

SOURCE (row label on left)

NUMBER OF COLUMN ENTRIES (row label on right of bottom row)

MAX COLUMN ENTRIES ON PORTS 3 AND PORTS 7 INDICATE
POTENTIAL GROUP SERVERS

SELF-CONFIGURING DATA COMMUNICATION SYSTEM AND METHOD

This application is a continuation of application Ser. No. 07/705,571, filed May, 24, 1991 now abandoned.

BACKGROUND OF THE INVENTION

1. Field of the Invention

The present invention relates to data communication on networks, and more particularly to a self-configuring data communication system and method.

2. Discussion of the Related Art

The popularity of small computers has brought into use a communication scheme wherein a number of stations time-share a common communication medium, such as an electrically conductive cable. These stations may each compete with each other for access to the bus at overlapping time intervals. Therefore, some mechanism must be provided to prevent conflicting use.

U.S. Pat. No. 4,063,220 discloses a multipoint data communication system having multiple stations that may compete for a common bus on an asynchronous basis. Each station includes a circuit for detecting when its own transmission collides with the transmission of another station. Sources of inefficiency in the system disclosed in this U.S. patent include unproductive time during which signals from multiple stations are colliding, and unproductive time during which the bus is idle while stations are waiting to reattempt a transmission.

To alleviate the problem discussed above, it has been proposed that a communication system be implemented using multiple networks, with each station assigned to a single network. In such a multi-network system, the networks are connected together by a bridge circuit. As a result, any station is able to communicate with any other station, even when a sending station is assigned to a different network than a receiving station.

Each station assigned to a network has a unique system address. Data is communicated in units of "packets," with each packet containing the system address of the station sending the packet (the source system address) and the system address of the station which is to receive the packet (the destination system address). A bridge circuit is provided to detect a packet sent by a station on one network and forward the packet to another network (a nonsending network), at times when the packet has a destination address residing on the other network. In order to keep the traffic on each network to a minimum, the bridge circuit tends to forward only those messages having a destination corresponding to a station assigned to the nonsending network.

To minimize overall system traffic, stations should be assigned to networks such that most of the communication between stations occurs within a network, instead of between networks. In other words, stations should be assigned to a particular network such that most packets appear on only one network and are not forwarded by a bridge.

FIG. 1 is a diagram illustrating communication traffic between stations 1010–1170. In FIG. 1, continuous lines between two stations indicate relatively heavy traffic flow, while dotted lines indicate relatively light traffic flow. Stations not directly connected by a line do not directly send packets to each other.

Stations such as 1010, 1020, 1050, 1090, and 1110 are typically workstations or terminals. A station such as station 1060 is typically a station that communicates with a number of other stations and presents common resources to other stations, such as large volume data storage resources, e.g., disc devices.

As can be seen in FIG. 1, most stations have links primarily with one other station, which is typically a server station, such as stations 1060, 1070, or 1130. Most of the traffic is within a group of stations that talk to a particular server, but some traffic goes between groups.

FIGS. 2(A)–2(B) show a system configuration having station assignments that tend to isolate activity to one of networks 2001, 2002, or 2003. As can be seen in FIGS. 2(A)–2(B), the stations 1010–1170 are assigned to networks corresponding to the three groups shown in FIG. 1.

During typical operation of such a multi-network system, if traffic is found to be high on a certain network resulting in performance degradation, stations are manually reassigned to different networks. The task of manually reassigning is labor intensive and, therefore, costly for at least two reasons. First, it may be difficult to determine how stations should be reassigned in order to improve performance. Second, assuming that it is known how stations should be reassigned, reassignment may involve manually changing interconnection circuits with jumpers or switches. Interconnection circuits such as those encompassed by line 2400 typically reside in a patch panel within a satellite equipment room of an office floor. Manually changing interconnection circuits may take anywhere from minutes to several hours.

ADVANTAGES AND SUMMARY OF THE INVENTION

It is an advantage of the invention to provide a system in which stations can be automatically assigned to a network.

To achieve this and other advantages of the invention, a controller for a communication system having a plurality of networks and a plurality of stations communicating with each other by sending messages from a source station to a destination station, comprises means, when set, for connecting each station to one of the networks; means for determining a communication history for the plurality of stations corresponding to the messages communicated; and means for setting the connecting means to connect each of the stations to one network in accordance with the communication history, wherein stations with the most communication among themselves tend to be assigned to a common network.

According to another aspect of the invention, a method of controlling a communication system having a plurality of networks and a plurality of stations communicating with each other by sending messages from a source station to a destination station, comprises the steps, performed by the communication system, of connecting each station to one of the networks, in accordance with a control signal; determining a communication history for the plurality of stations corresponding to the messages communicated including the substep of monitoring the messages sent on the networks; and generating the control signal to connect each of the stations to one network in accordance with the communication history, wherein the control signal tends to assign stations with the most communication among themselves to a common network.

According to yet another aspect of the invention, in a communication system having a plurality of networks and a plurality of stations communicating with each other by sending messages from a source station to a destination station, a method of distributing stations among networks, comprises the steps of assigning the stations to a set of groups of stations such that each station is assigned to at least one group; and processing a group in the set of groups including the substeps, performed for each network, of assigning all stations of the group onto a network if a lower cost would result, and reassigning those stations of the group that are common to multiple groups among the networks if a lower cost would result.

The accompanying drawings, which are incorporated in and which constitute a part of this specification, illustrate one embodiment of the invention and, together with the description, explain the principles of the invention.

BRIEF DESCRIPTION OF THE DRAWINGS

FIGS. 2(A) & 2(B) are diagrams of a proposed system allowing the manual reassignment of stations to networks.

FIG. 3 comprising

FIG. 12 is a diagram of a data base used to analyze system communication traffic.

DESCRIPTION OF THE PREFERRED EMBODIMENTS

Figure 1:
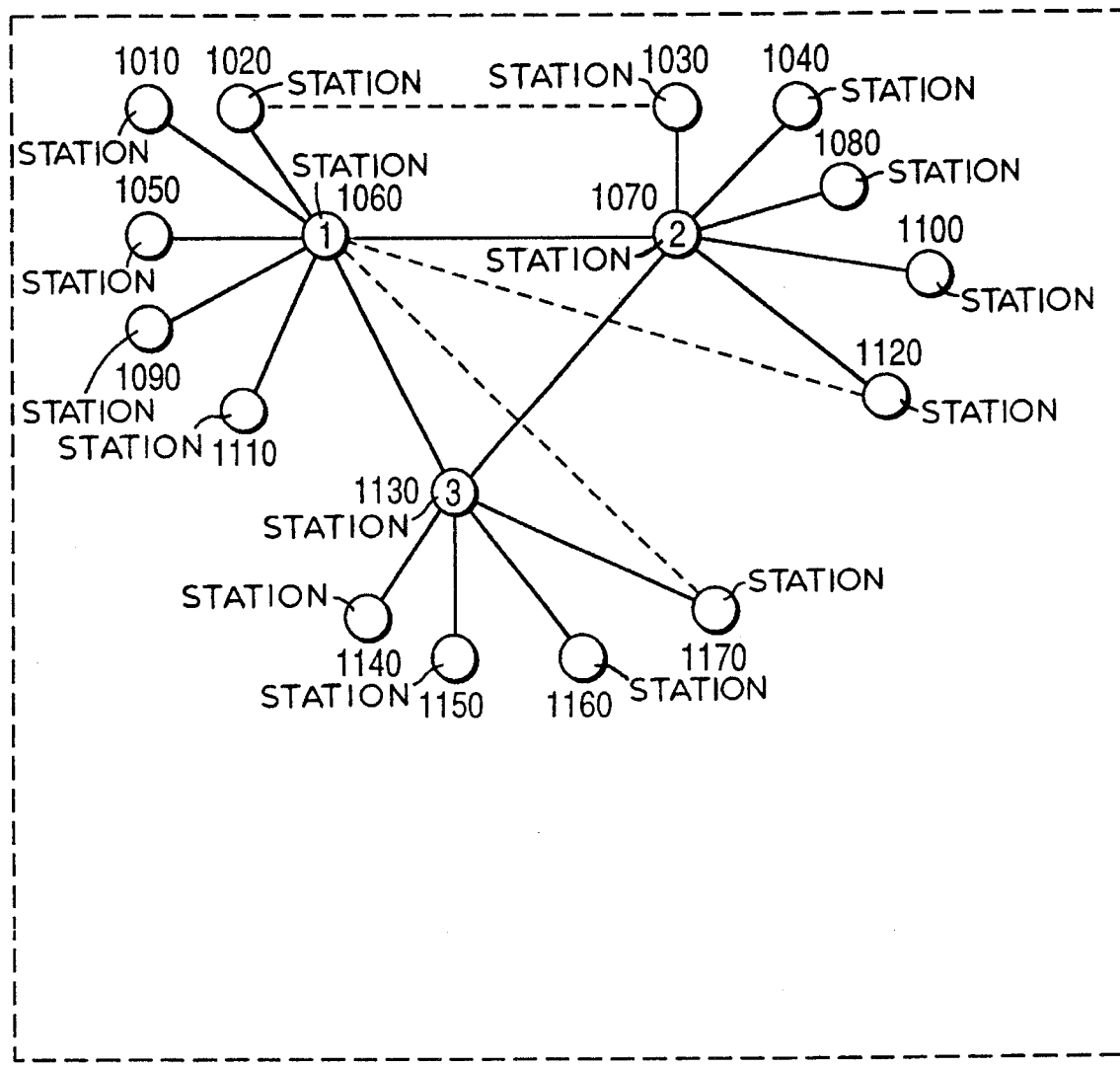
FIG. 1 is a diagram illustrating relative quantities of communication between stations.
Figure 2B:
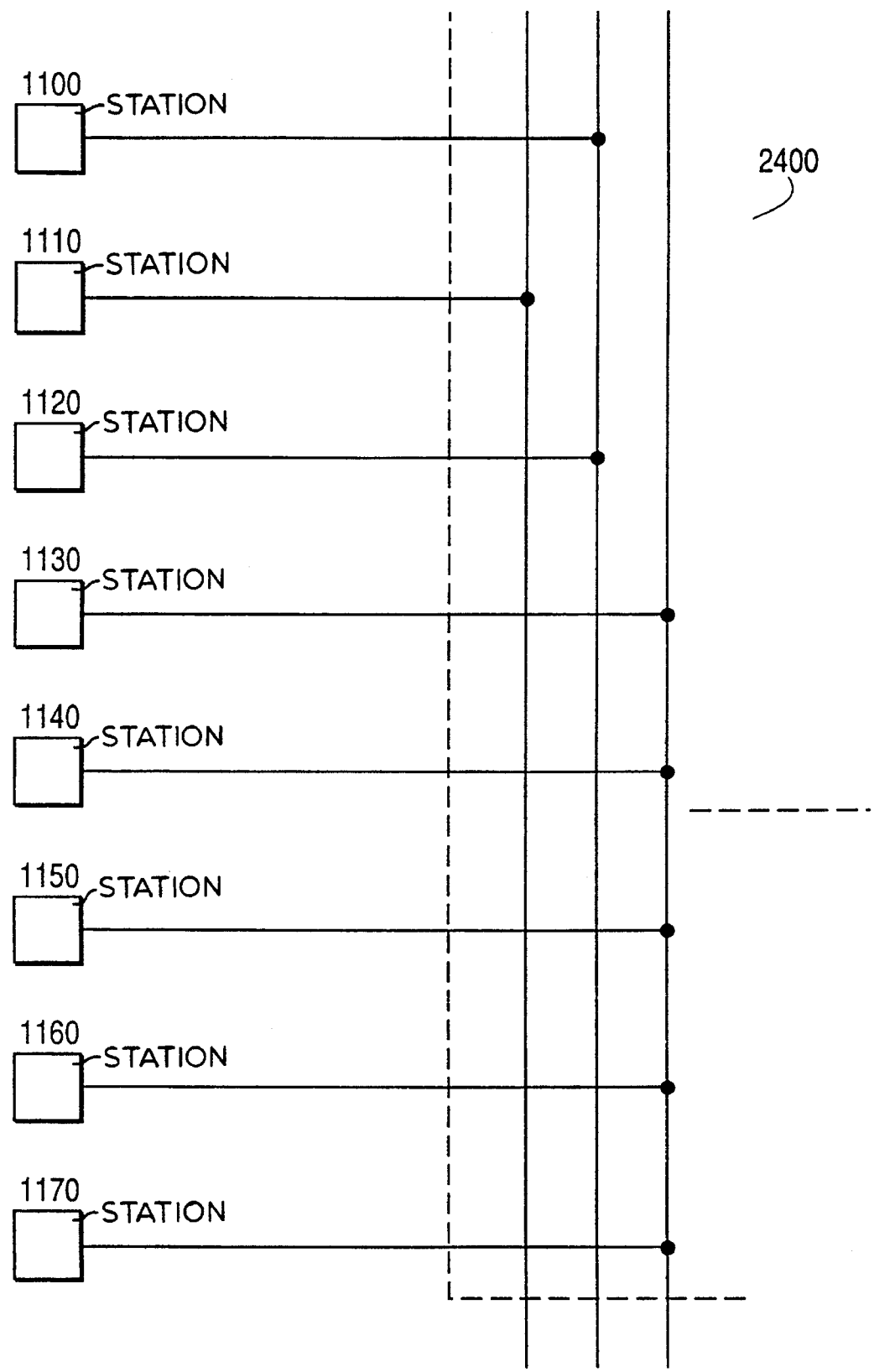
Figure 3A:
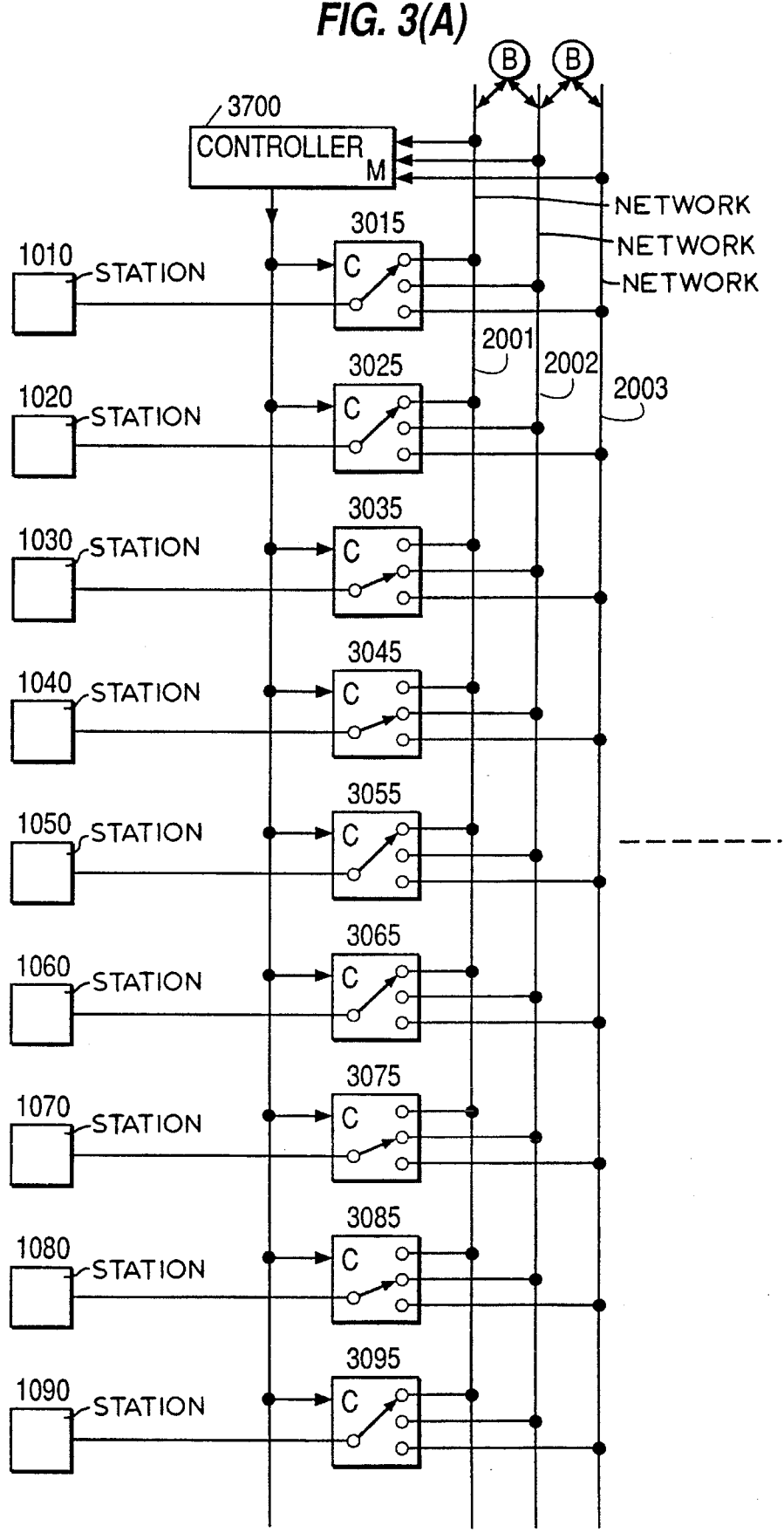
FIGS. 3(A) & 3(B), is a diagram of a basic topology of a communication system according to the preferred embodiments of the present invention.
Figure 3B:
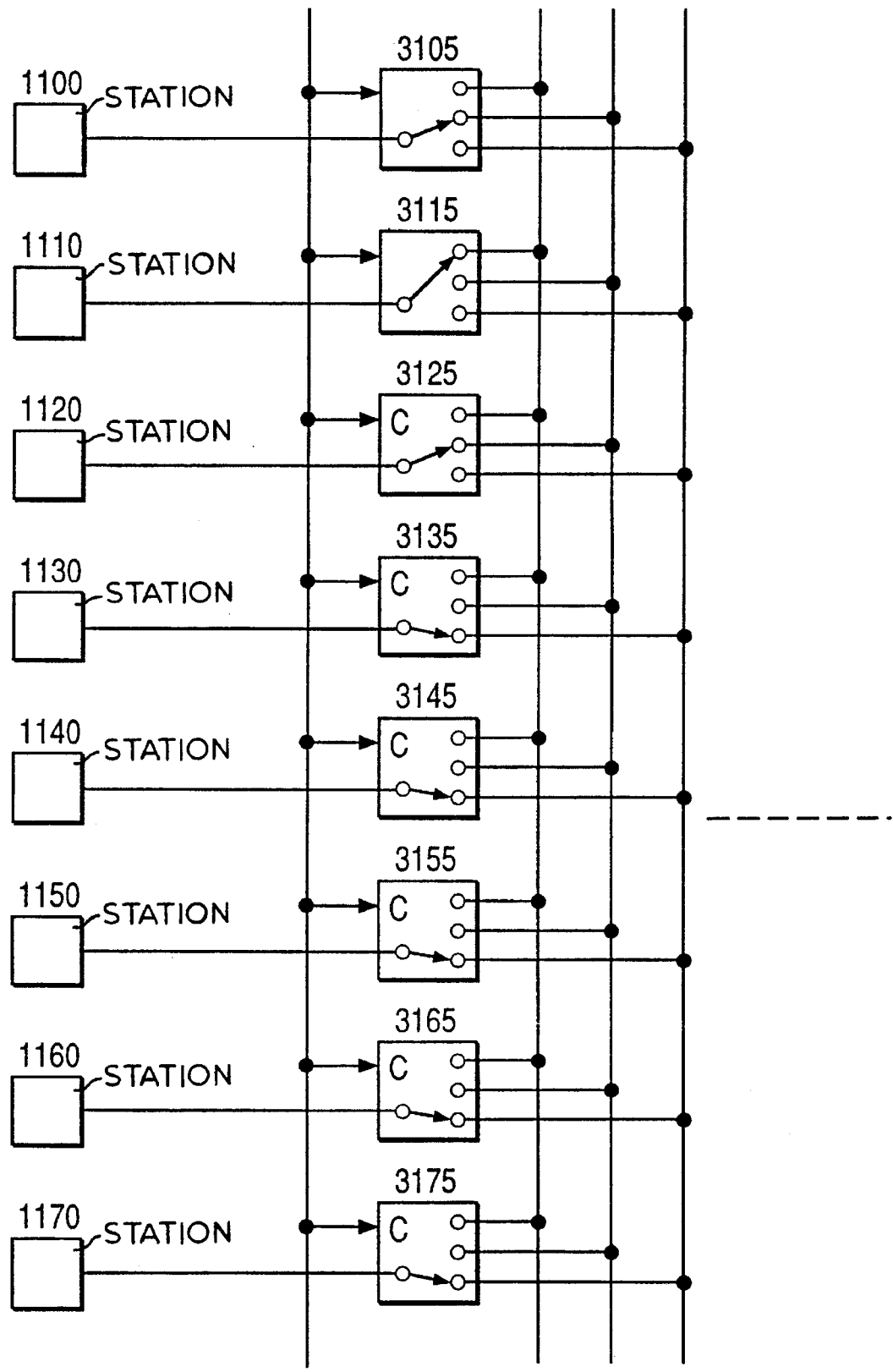

FIGS. 3(A)–3(B) are a block diagram illustrating a basic topology of a self-configuring communication system according to the preferred embodiments of the present invention. Each station is connected to one of networks 2001, 2002, or 2003 through a multiplexor. Each multiplexor, such as multiplexor 3025 connected to station 1020, has a control input labeled "C" through which controller 3700 controls the connection of a station to one of networks 2001, 2002, or 2003. Controller 3700 monitors communication traffic through inputs labeled "M". Controller 3700 periodically analyzes monitored traffic, and then sets each multiplexor so that groups of stations with the heaviest communication among themselves tend to be assigned to a common network. The multiplexor settings shown in FIG. 3(A) are shown implementing the connection described in FIGS. 2(A)–2(B).

The preferred embodiments of the present invention include eight networks. To facilitate description, only three networks are shown in FIG. 3.

Topology of First Preferred Embodiment

Figure 4:
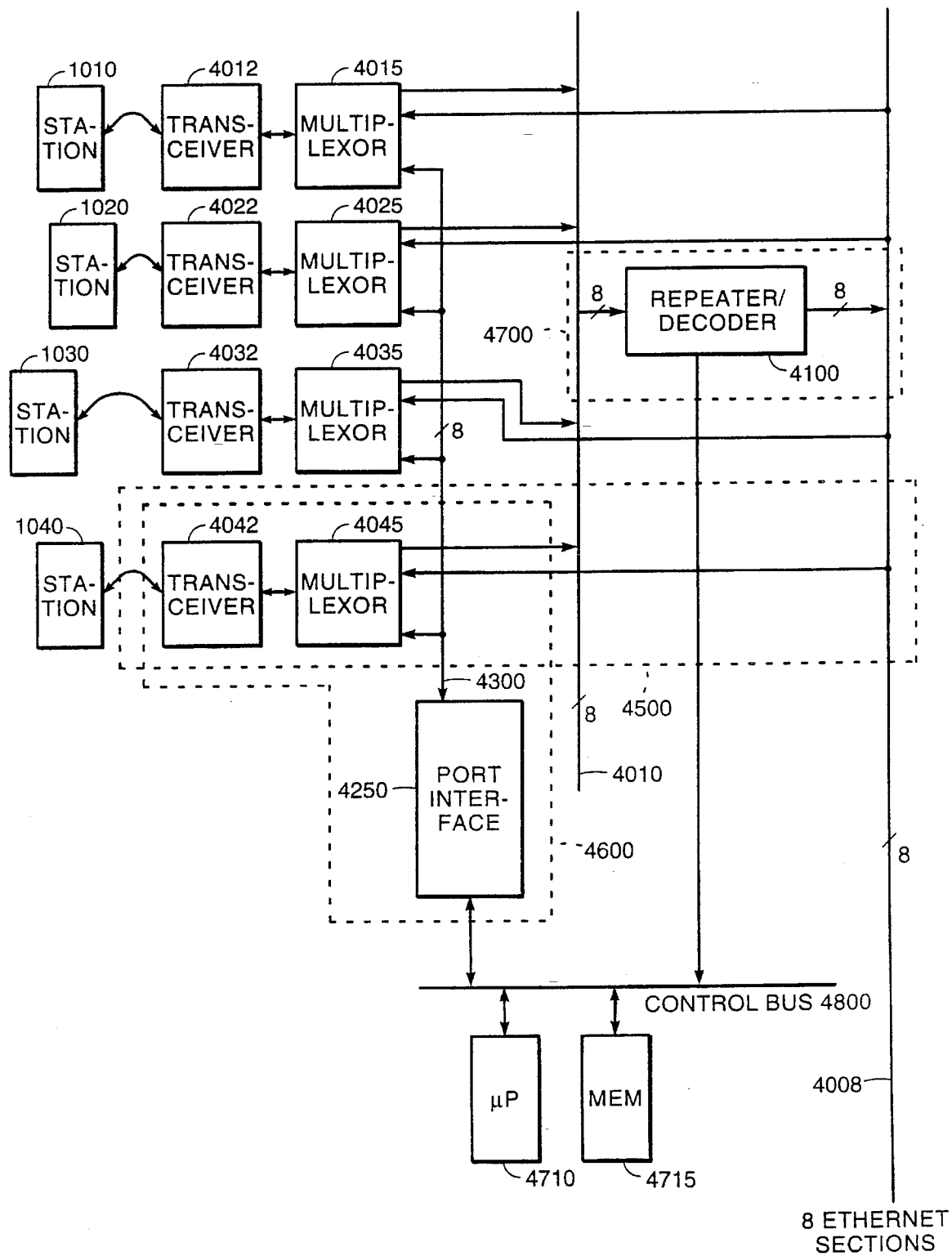
FIG. 4 is a block diagram of a topology of a communication system according to the first preferred embodiment of the present invention.

FIG. 4 is a block diagram illustrating a topology of a self-configuring communication system according to a first embodiment of the present invention. FIG. 4 is a more specific version of FIG. 3.

Station 1010 is connected to one of 8 ethernet sections in local ethernet sections 4008 via transceiver 4012 and multiplexor 4015. Multiplexor 4015 is set by microprocessor 4710 to connect to one of the 8 ethernet sections as will be described later. Similarly, station 1020 is connected to one of the 8 ethernet sections via transceiver 4022 and multiplexor 4025, and station 1030 is connected to one of the 8 ethernet sections via transceiver 4032 and multiplexor 4035, etc.

Local ethernet sections 4008 do not necessarily correspond to an industry ethernet standard. Local ethernet sections 4008 are connected to a standard ethernet through a media device interface, which converts local ethernet signals to standard ethernet signals. In FIG. 4, each of transceivers 4012, 4022, 4032, and 4042 is a media device interface. The media device interfaces can be, for example, a 10BASE2 (thin wire) interface or a 10BASE5 (backbone) interface.

Bridge circuits (not shown) selectively forward packets from one ethernet section to another ethernet section, as described in the BACKGROUND OF THE INVENTION section of this specification.

Station 1030, for example, may communicate with station 1010 by sending a packet containing a network destination address for station 1010.

Repeater/Decoder 4100 operates when a station sends a packet. Repeater/Decoder 4100 contains circuitry to receive and buffer a packet sent from one of the stations, and resends the packet onto the first ethernet section. It is desirable to have repeater 4100 buffer and resend packets destined for one of the ethernet sections because packets sent from the stations have accumulated jitter by the time the packet reaches the output of the associated multiplexor. There is one set of repeater circuitry for each of the 8 ethernet sections.

Repeater/Decoder 4100 also contains circuitry to decode the source system address, destination system address, and size of a packet and to send this data over control bus 4800. Similar to the buffer circuitry, there is one set of decoder circuitry for each ethernet section. The decoder circuitry includes circuitry to interrupt microprocessor 4710 to inform microprocessor 4710 that data is newly available in interface registers of Repeater/Decoder 4100.

In the first preferred embodiment, each multiplexor is one of up to 192 multiplexors incorporated in a composite multiplexor. Thus, the composite multiplexor has 192 ports with each port connected to at least one station. The composite multiplexor also includes port interface 4250.

The composite multiplexor has 192 ports because standard telephone cabling contains 25 pairs of twisted pair cabling. Each port requires 2 pairs for ethernet transmission. Thus, the cable can support 12 port connections per cable. A typical office building of 100×200 feet would have approximately 200 offices, which could be supported by 16 sets of 12 port connections, or by 16 sets of cables, for a total of 192 port connections.

Port interface 4250 operates when a station sends a packet. Port interface 4250 has circuitry to determine the port number of the station sending the packet and to transfer the port number to memory 4715 via control bus 4800. Port interface circuitry 4250 includes eight memory map device interfaces, one for each ethernet section. Port interface 4250 includes circuitry to interrupt microprocessor 4710 to inform microprocessor 4710 that a port number is newly available in interface registers of Port interface 4250.

According to an aspect of the invention, there is provided a controller for a communication system having a plurality of networks. As embodied herein, each network is one of a total of 8 ethernets in local ethernet sections 4008.

According to an aspect of the invention, there is provided a controller for a communication system having a plurality of stations communicating with each other. As embodied herein, the plurality of stations include stations 1010, 1020, 1030, and 1040, which follow the IEEE 802.3 10BASET ethernet standard protocol.

According to an aspect of the invention, means is provided when set, for connecting each station to one of the networks. As embodied herein the connecting means includes multiplexors 4015, 4025, 4035, and 4045.

According to an aspect of the invention, means is provided for determining a communication history of the plurality of stations. As embodied herein, the determining means includes repeater/decoder 4100, microprocessor 4710, and a program executed by microprocessor 4710.

According to an aspect of the invention, responsive to the communication history, means is provided for setting the connecting means to connect each of the stations to one of the networks in accordance with the communication history. As embodied herein, the setting means includes microprocessor 4710, another program executed by microprocessor 4710, and port interface 4250.

Figure 5:
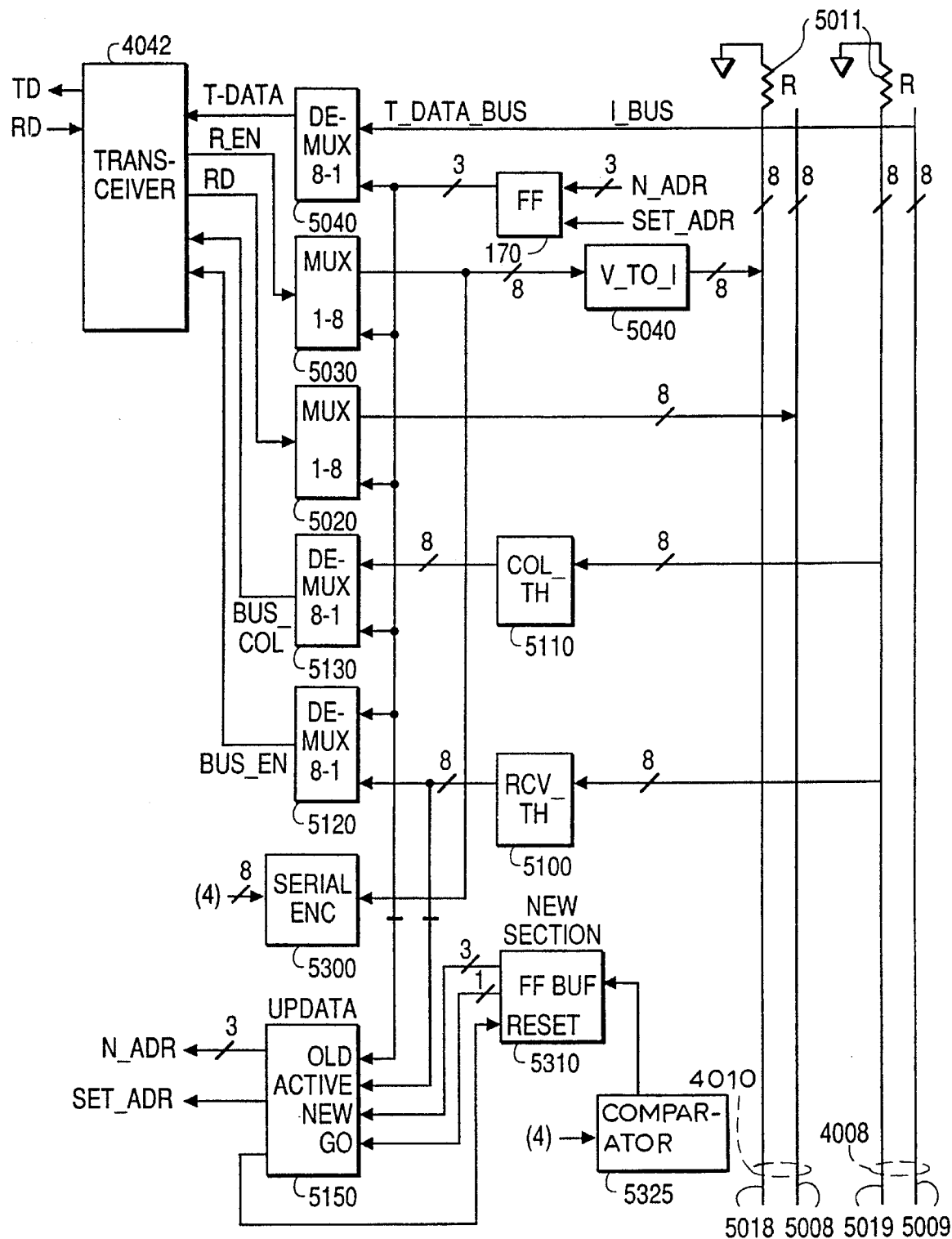
FIG. 5 is a more detailed block diagram of some of the circuits shown in FIG. 4.

FIG. 5 is a block diagram showing sections of FIG. 4 in more detail. FIG. 5 corresponds to circuitry within dotted line 4500 in FIG. 4. Transceiver 4042 is connected to a station via two twisted pair cables, one twisted pair for receiving data RD from the station and another twisted pair for sending data TD to the station Data received from the station is steered to one of the eight ethernet sections by 1–8 multiplexor 5020, which is a standard TTL circuit.

Transceiver 4042 also contains circuitry to generate a signal R_EN indicating that data is being received from the station. Transceiver 4042 applies R_EN to bus 5018 via multiplexor 5030 and voltage-to-current converter 5040. Voltage-to-current converter 5040 contains eight constant current sources, each having a TTL input to turn on a constant current, with one current source for each ethernet section. If resistors 5011 have a resistance of R, the current generated by each constant current source is equal to TH/R, where TH is a nominal design threshold.

Data to be received by the station comes from bus 5009 to demultiplexor 5040 and is applied to transceiver 4042 as T_DATA.

Receive threshold detector 5100 has an output indicating that the voltage on bus 5019 exceeds 0.5 * TH. Each output of receive threshold detector 5100 indicates that at least one other station is sending data on the associated ethernet section. Similarly, collision threshold detector 5110 has an output indicating that the voltage on current bus 5019 exceeds 1.5 * TH. Each output of collision threshold detector 5110 indicates that more than one station is sending on the associated ethernet section.

One of the eight signals from receive threshold detectors 5100 is selected by demultiplexor 5120 and applied to transceiver 4042 as the signal BUS_EN. Similarly, one of the eight signals generated by collision threshold detector 5110 is selected by demultiplexor 5130 and applied to transceiver 4042 as the signal BUS_$_{COL}$.

Figure 6:
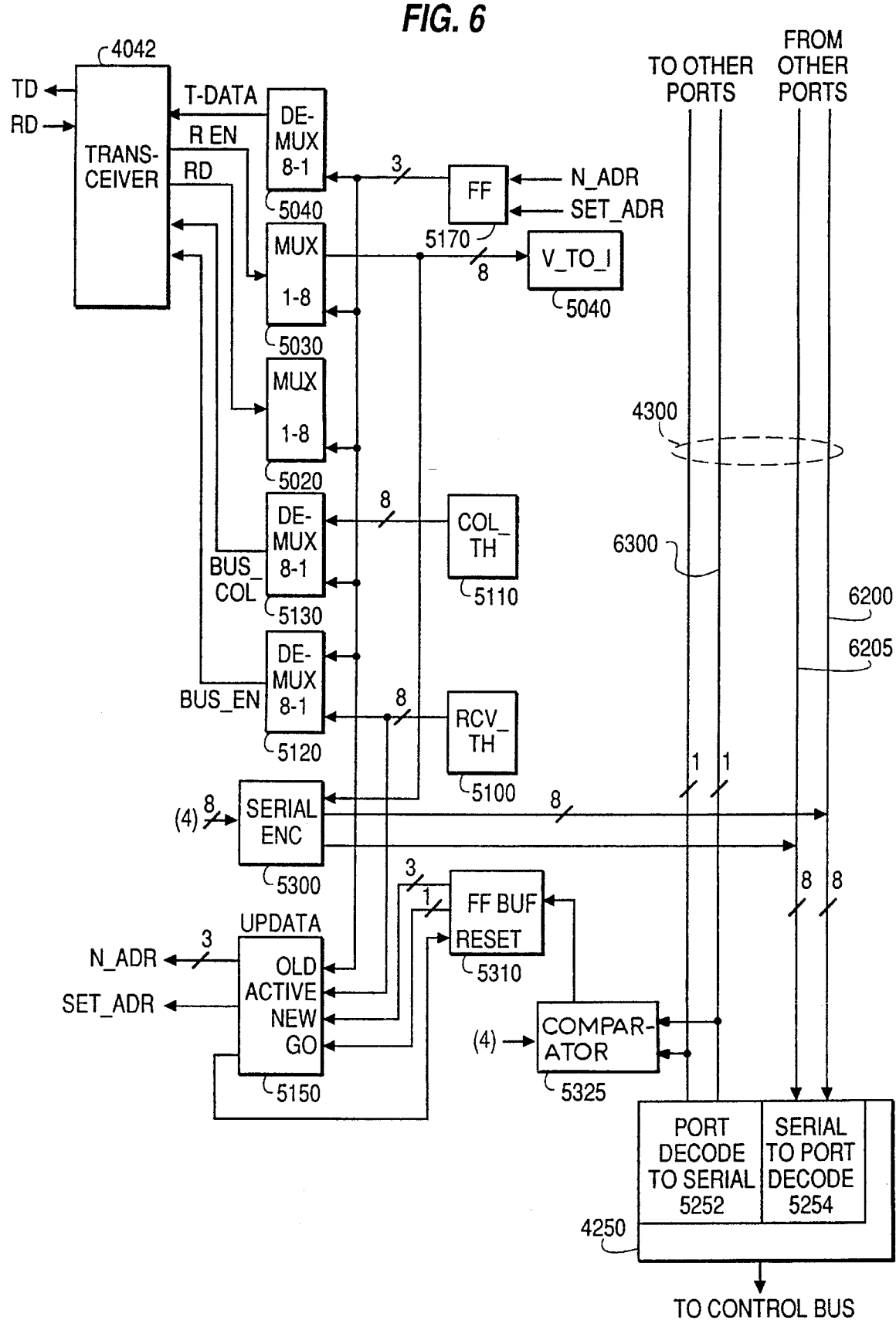
FIG. 6 is a more detailed block diagram of other circuits shown in FIG. 4.

FIG. 6 is a block diagram showing other sections of FIG. 4 in more detail. FIG. 6 corresponds to the circuitry within dotted line 4600 in FIG. 4. Serial encoder 5300 includes circuitry to send the port number over one of the eight lines connected to bus 6200, the particular line selected being determined by which of the eight lines from receive threshold detector 5100 is active. Port interface 4250 contains serial-to-port decoder 5254, which buffers serial data received on bus 6200. Port interface 4250 contains a memory mapped device interface capable of sending data on control bus 4800 and interrupting microprocessor 4170. Bus 6205 carries synchronization signals for the sending of data on bus 6200.

The setting means includes address generating means, responsive to a packet, for generating the source system address of the packet. Port interface 4250 includes a plurality of lines, each corresponding to one of the ethernet sections, a plurality of buffers, each responsive to one of the plurality of lines; means, responsive to a selected one of the plurality of buffers, for generating the contents of the selected one of the plurality of buffers; and processor means, responsive to the address generating means and to the port interface means. The composite multiplexor includes a plurality of ports, each port having a port number, and means, responsive to a packet, for applying a port number to a selected one of the plurality of lines.

Port decode-to-serial 5252 has circuitry to transfer data received from microprocessor 4710 onto bus 6300. The data consist of an 8-bit port number followed by a 3-bit ethernet section number. Comparator 5325 compares the eight bits sent on bus 6300 with the port number of this port, for the port illustrated in FIG. 6, and enables latching of the three-bit ethernet section number into buffer 5310 when a match occurs.

The setup information communicated from microprocessor 4710 to each port on the composite multiplexor is buffered in each port, allowing the composite multiplexor to choose an appropriate time (i.e., when there is no traffic on either the old ethernet section or the new ethernet section) to change the setting on each multiplexor. This buffering function is performed by update controller 5150, which is a state machine that receives a new section number from buffer 5310 and an old section number from buffer 5170. Update controller 5150 has circuitry to transfer the contents of buffer 5310 to buffer 5170 at an appropriate time.

Figure 7:
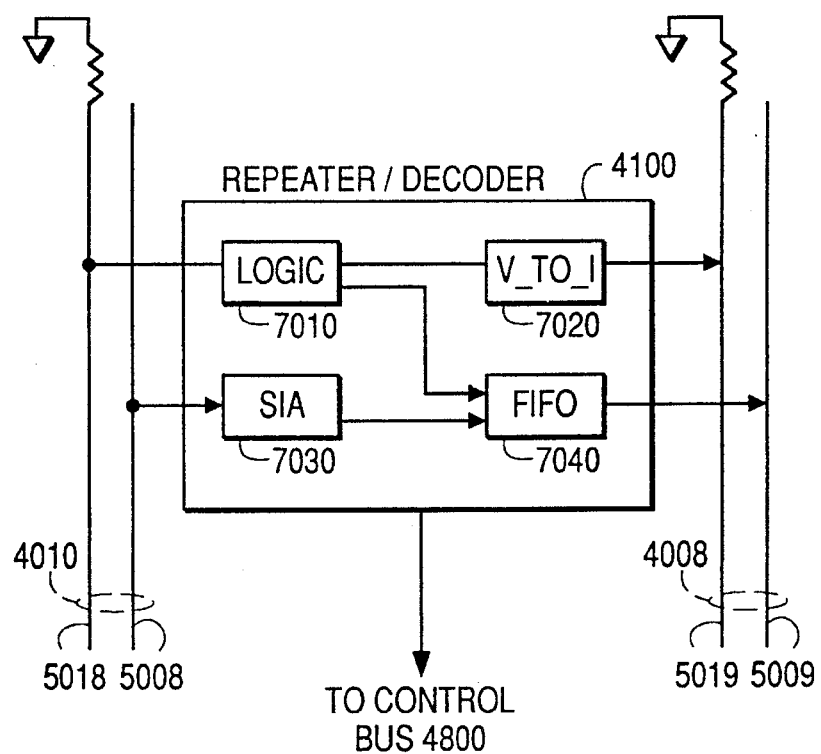
FIG. 7 is a more detailed version of still other circuits shown in FIG. 4.

FIG. 7 is a block diagram showing other sections of FIG. 4 in more detail. FIG. 7 corresponds to the circuitry within dotted line 4700 in FIG. 4. Logic 7010 and voltage-to-current converter 7020 repeat a signal on bus 5018 onto bus 5019. Serial interface adapter 7030 includes circuitry to decode a Manchester encoded signal on bus 5008 and apply it to first-in first-out buffer 7040, so that a packet sent on bus 5008 is repeated onto bus 5009. Repeater/decoder 4100 includes a memory mapped device interface capable of sending data on control bus 4800 and 4100 and interrupting microprocessor 4710. Repeater/Decoder 4100 has circuitry to determine the source system address, destination system address, and size of a packet stored in first-in first-out buffer 7040, and to send this data on control bus 4800.

Repeater/Decoder 4100 also includes a collision detector (not shown), allowing Repeater/Decoder 4100 to send a "jam signal" on an ethernet section when a collision occurs, thereby clearing traffic from the ethernet section.

When a collision is detected on bus 5018 by a collision module similar to collision threshold detector 5110, indicating that data on bus 5008 is corrupted, logic 7010 in Repeater/Decoder 4100 will ensure that ethernet protocols are maintained. When logic 7010 detects a collision on bus 5018, logic 7010 introduces a 10 MHz square wave jam signal into FIFO 7040 which is applied to bus 5009. The jam signal will be sent until there is no signal on bus 5018. Logic 7010 otherwise ensures that standard ethernet protocols are maintained.

Figure 8:
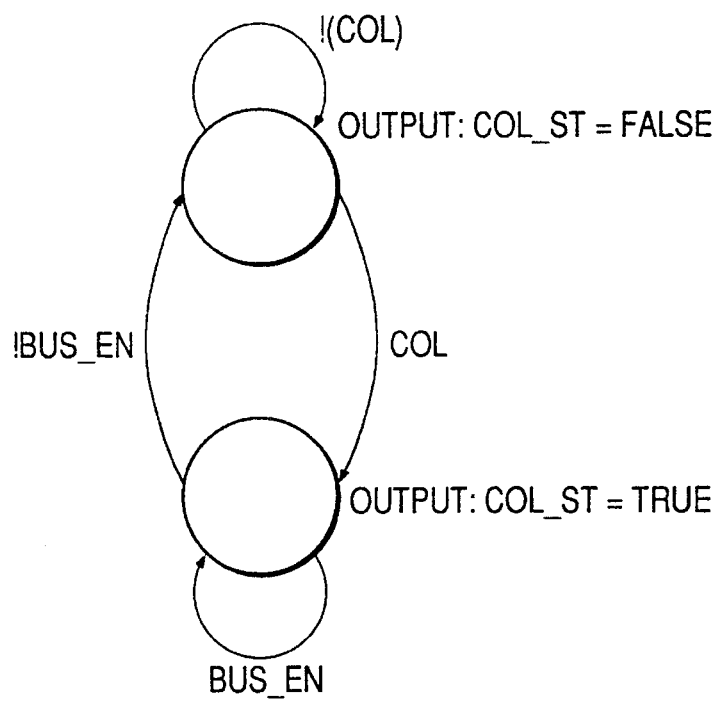
FIG. 8 is a state diagram illustrating features of transceiver 4042 of FIGS. 5 and 6.

FIG. 8 is a state machine illustrating how transceiver 4042 determines the data TD to send to the station. FIG. 8 should be read in conjunction with the signals shown in FIG. 5 and the following equations:

COL = BUS_COL

TD = (!COL_ST AND (T_DATA AND BUS_EN AND !R_EN)) OR ((COL_ST AND BUS_COL AND T_DATA) OR (COL_ST AND !BUS_COL AND (!R_EN OR (COL_WAIT_BUS AND R_EN))) AND T_DATA), where "AND" denotes the AND logical operation, "OR" denotes the OR logical operation, and "!" denotes negation logical operation. COL_WAIT_BUS is a signal corresponding to the BUS$_{13}$ COL signal. COL_WAIT_BUS makes a transition to true at approximately the same time as BUS$_{13}$COL, and makes a transition to false approximately 1000 nanoseconds after BUS$_{13}$COL. Note that COL$_{13}$ ST is a signal generated internally in transceiver 4042.

Each network respectively includes a network data bus for carrying a packet, and a network status bus for indicating whether a packet is being sent over the network data bus. The means for connecting includes a plurality of ports. Each port includes a transceiver, coupled to a station. The transceiver contains means for generating a first signal indicating that the station is sending a packet; means, coupled to the station, for sending the packet to one of the network data busses; and means, coupled to the first signal, for applying a current I to one of the network status busses.

The connecting means includes means for applying a packet carried on one of the network data busses to the transceiver. There is a means selectively responsive to the one of the network status busses, for applying a second signal to the transceiver in accordance with a voltage on the one of the network status busses being substantially greater than 0 and less than or equal to I×R, There is also a means, selectively responsive to one of the network status busses, for applying a second signal to the transceiver in accordance with a voltage on the one of the network status busses being substantially greater than I×R. The transceiver further includes means for selectively sending the packet to the station in accordance with the first and second signals.

Operation of the First Preferred Embodiment

Figure 9:
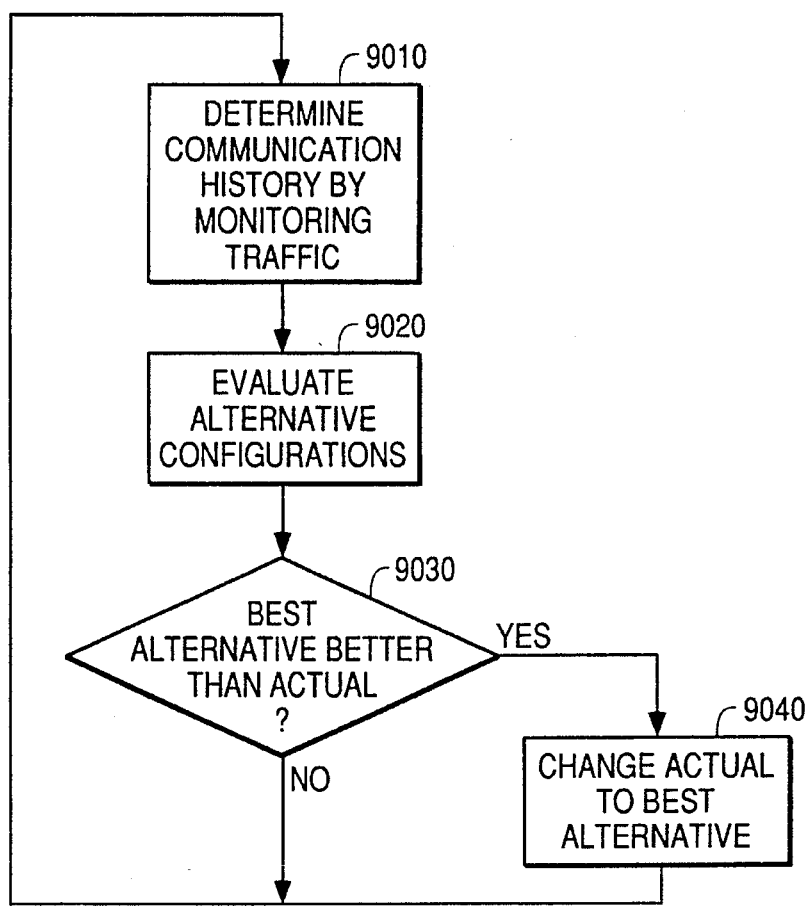
FIG. 9 is a flowchart of an operation of the communication system according to a preferred embodiment of the invention.

FIG. 9 is a flowchart overviewing an operation of the communication system according to a preferred embodiment of the invention. First, a communication history is determined by monitoring communication traffic among the stations in the system. (Step 9010). After traffic has been monitored for a sufficient amount of time, various alternative system configurations are evaluated (Step 9020), and if an alternative better than the actual configuration of the system is found (Step 9030), the actual configuration is changed to the better alternative. (Step 9040). Control then returns to Step 9010.

Figure 10:
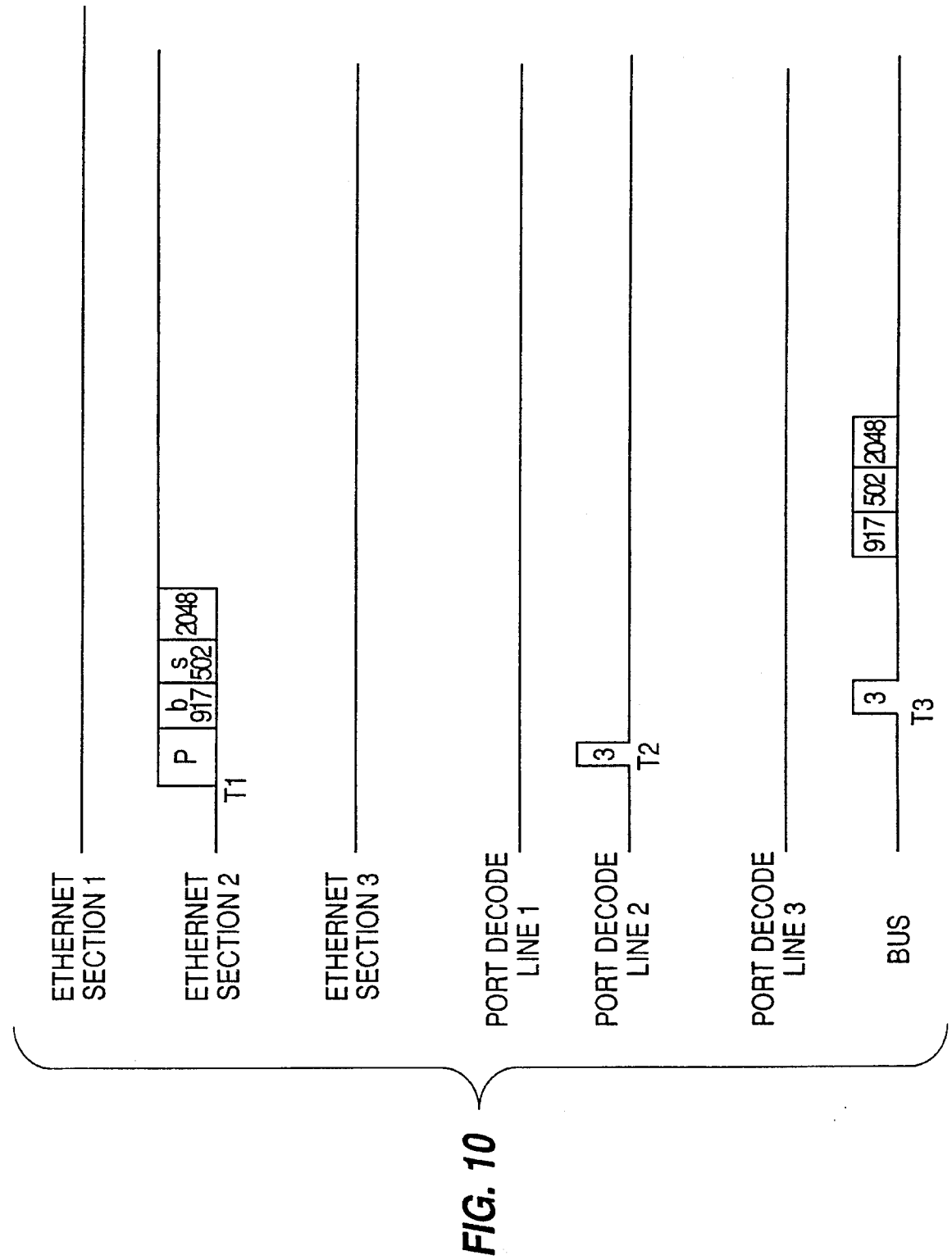
FIG. 10 is a timing diagram illustrating one of the steps of FIG. 9.

FIG. 10 is a timing diagram illustrating an aspect of Step 9010 in more detail, and also illustrates how the preferred embodiments associate a station with a port number in order to switch the multiplexors in Step 9040. FIG. 10 illustrates how microprocessor 4710 receives system addresses on control bus 4800 and receives a port number on control bus 4800. Corresponding pairs of source system addresses and destination system addresses will be used to determine which stations communicate with each other. Corresponding pairs of source system addresses and port numbers will be used to associate a station with a port number.

FIG. 10 should be read along with FIG. 4. In FIG. 10, the signals labeled ETHERNET SECTION are on respective lines of bus 4010 in FIG. 4, and each correspond to a respective ethernet section. The signals labeled PORT DECODE are on respective lines of bus 4300 in FIG. 4, and each correspond to a respective ethernet section of size 2048 bits. At a time T1, for example, station 1030 sends a packet destined for station 1040, having system address 917. As shown in the waveform for ethernet section 2, the packet includes a preamble (P), a destination system address (D), a source address (S), and size information. Because station 1030 is connected to ethernet section 2, circuitry for the port for station 1030 sends a 3 to port interface 4250 at time T2. This 3 is buffered in registers in port interface 4250 and sent over control bus 4800 when microprocessor 4710 reads the registers at a time T3. Repeater/Decoder 4100 determines the destination system address, source system address, and size information, buffers this data in registers, and sends this data over control bus 4800 when microprocessor 4710 reads the registers at time T4. Both Repeater/Decoder 4100 and port interface interrupt microprocessor 4710 to inform microprocessor 4710 that data is newly available in their respective registers.

There is a port associated with each station. The setting means includes means for associating a port with a system address of a station sending a packet; and means, responsive to the associating means, for setting the port.

It is possible for multiple multiplexors to be active sending a valid packet, as bridge circuits tend to isolate local traffic to their respective ethernet sections. In this case, port interface 4250 should transfer all active port numbers to control bus 4800, and Repeater/Decoder 4100 should also transfer their respective system addresses and sizes to control bus 4800 allowing microprocessor 4710 to perform its association function even when there are multiple ports simultaneously active. Because port interface 4250 has a port decode line dedicated to each different ethernet section, as described earlier in conjunction with FIG. 6, port interface 4250 can receive port numbers concurrently. Port interface 4250 has a buffer for each port decode line, allowing interface 4250 to transfer one port number at a time to control bus 4800.

Figure 11:
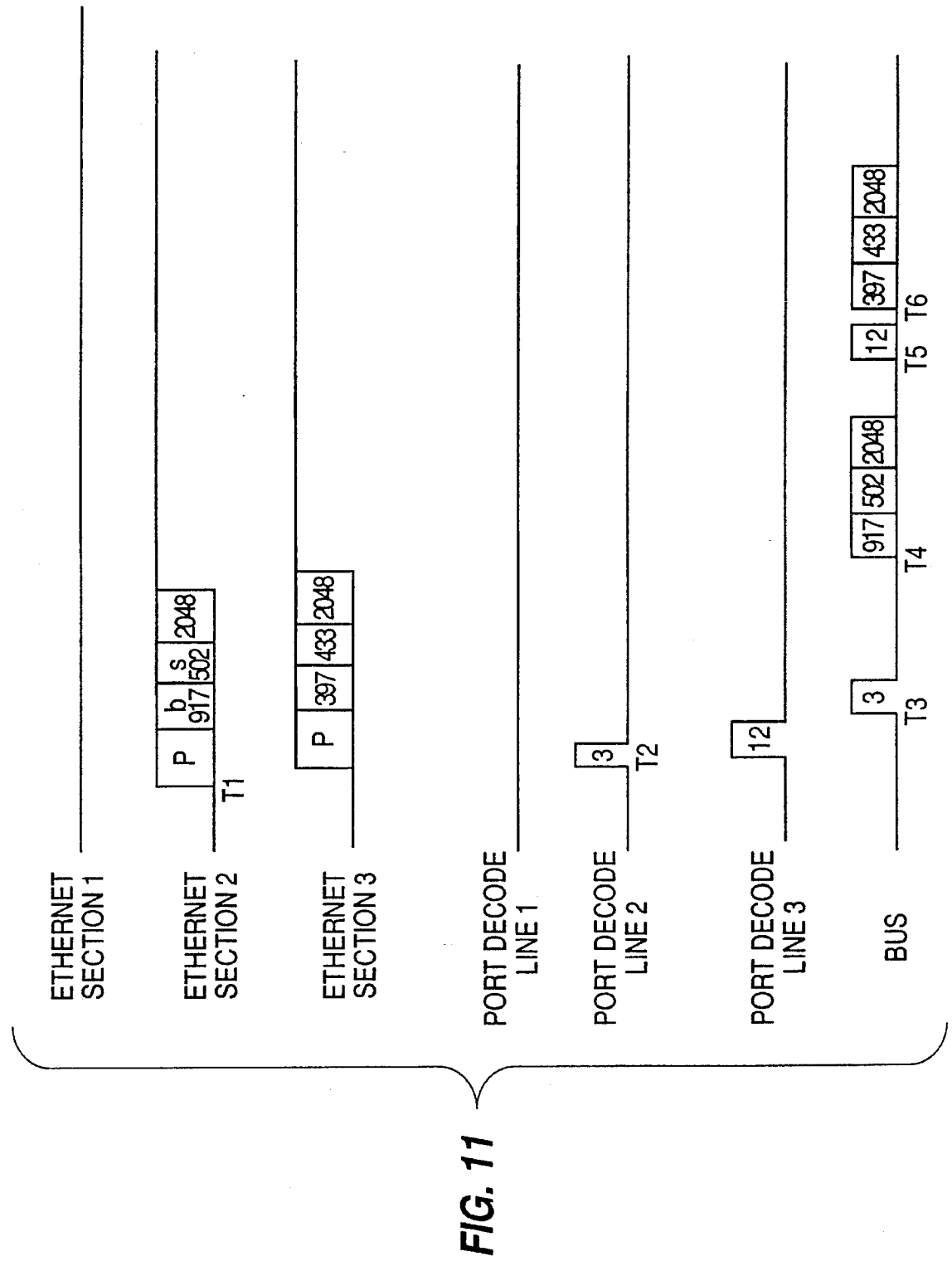
FIG. 11 is timing diagram illustrating one of the steps of FIG. 9.

FIG. 11 is a timing diagram illustrating the operation when there are concurrent packets on different ethernet sections. FIG. 11 corresponds to FIG. 10, except a packet is on ethernet section 3 sent by a station connected to ethernet section 3 at a time overlapping the sending of a packet by a station connected to ethernet section 2. As can be seen in FIG. 11, port decode line 3 carries the port number of the station sending on ethernet section 3, which is buffered by port interface 4250. At a later time T5, port interface 4250 applies 12 to control bus 4800. At a time T6 Repeater/Decoder 4100 applies a 433 to control bus 4800. In summary, the system receives data for the concurrent packets in parallel, buffers the data, and then sends the data serially on control bus 4800 when control bus 4800 is available.

FIG. 12 is a diagram of a traffic matrix 12000 maintained by microprocessor 4710 during its monitoring operation of Step 9010. When a packet is sent, microprocessor 4710 increments an entry in the matrix corresponding to the amount of data sent from a particular source address to a particular network destination address. In the preferred embodiment, the entry is incremented by the number of 64 bit bytes in the sent packet. Traffic matrix 12000 is used to assign the stations into groups, as will be described later.

In a preferred embodiment, the determining means discussed earlier includes a matrix, having rows indexed by source system address and columns indexed by destination system address, for storing a value indicating a quantity of information transferred from each station to each other station; and means for updating the matrix when a packet is sent.

After microprocessor 4710 has monitored communications for a sufficient amount of time, which could be from hours to days, alternative configurations are evaluated by analyzing communication traffic. (Step 9020). There are a number of methods of generating alternative configurations. One preferred method includes assigning each station to at least one group, and then switching all stations in a group to a common ethernet section.

Figure 13:
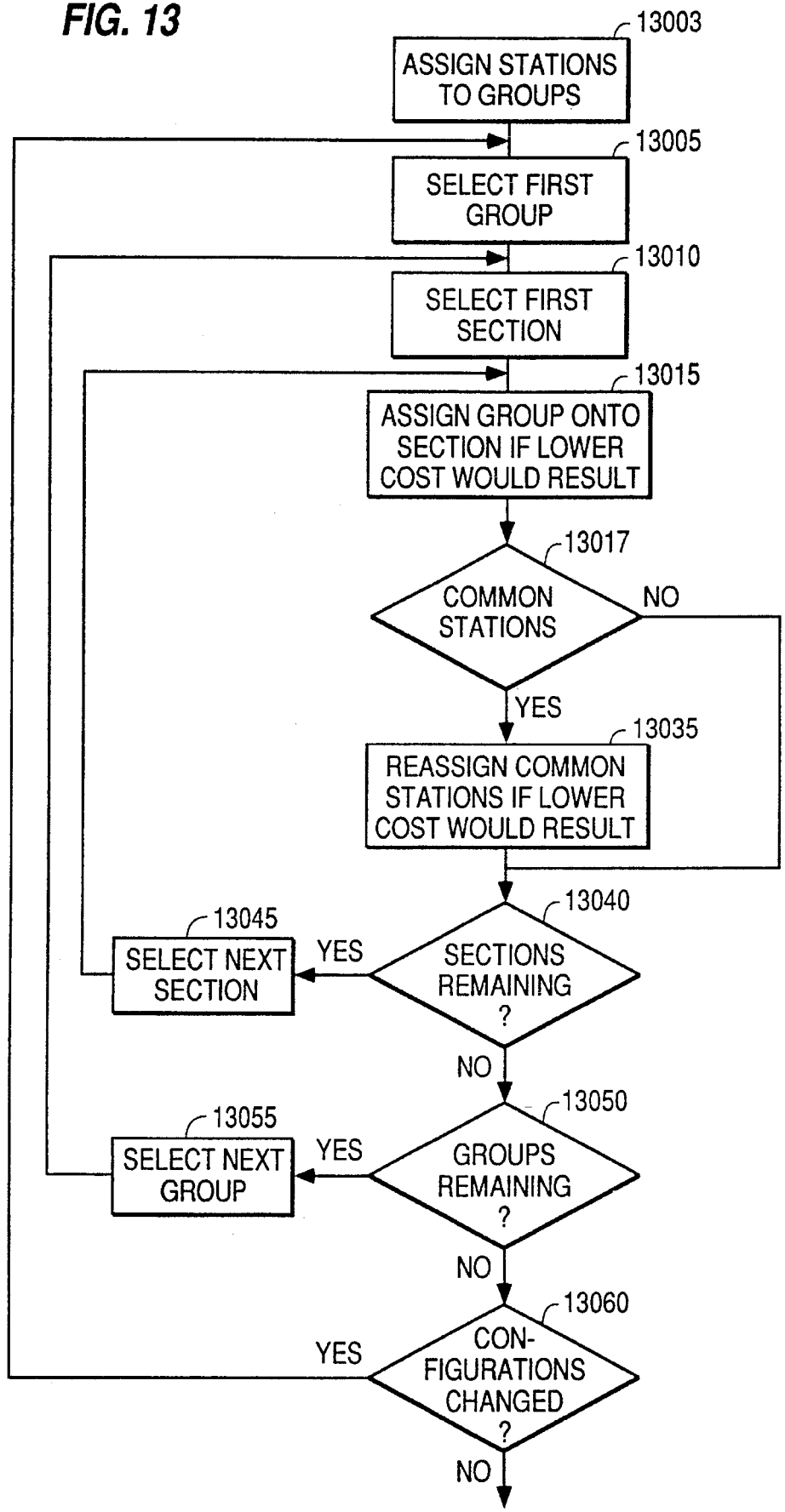
FIG. 13 is a flowchart illustrating one of the steps of FIG. 9.

FIG. 13 is a flowchart illustrating Step 9020 of FIG. 9 in more detail. First, stations are assigned to groups such that each station belongs to at least one group (Step 13003). The first group (Step 13005) and first ethernet section (Step 13010) are selected. All stations in the currently selected group are assigned onto the currently selected section if such a change would result in an improvement in COST, as discussed later (Step 13015).

A station can be common to multiple groups, as will be discussed in detail later. If the currently selected group includes common stations (Step 13017), the method reassigns common stations of the currently selected group among ethernet sections of the other groups of which it is a member if a lower COST would result. (Step 13035) (The ethernet section of a group is the ethernet section of the "server" station of the group. The server station will be discussed in more detail below in conjunction with FIG. 14.)

If there are any sections remaining (Step 13040), the next section is selected (Step 13045) and control passes to Step 13015. After all sections have been processed with the currently selected group, if there are groups remaining (Step 13050), the next group is selected (Step 13055) and control passes to Step 13010. After all groups have been processed with all sections it is determined whether the configuration changed as a result of the most recent execution of Steps 13005–13055. (Step 13060) If the configuration changed, control passes to Step 13005 in an attempt to further optimize the configuration.

Figure 14:
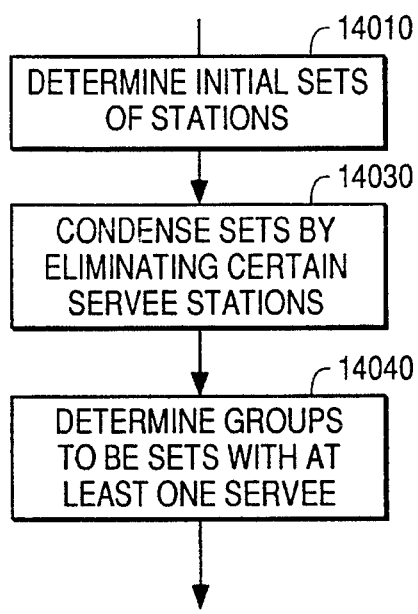
FIG. 14 is a flowchart illustrating one of the steps of FIG. 13.

FIG. 14 is a flowchart illustrating Step 13003 of FIG. 13 in more detail. First, initial sets of stations are assigned to a group, with each set including a destination station receiving traffic from more than one source station, and the corresponding source stations (Step 14010). In terms of traffic matrix 12000, the number of sets will be the number of columns with more than one non-zero entry. The destination station for a set is called the "server", and each source station for a set is called a "servee". Next, each set is condensed by eliminating all servees if they are also servers for a larger set (Step 14030). The groups are the sets with a server and at least one servee (Step 14040).

Figure 15:
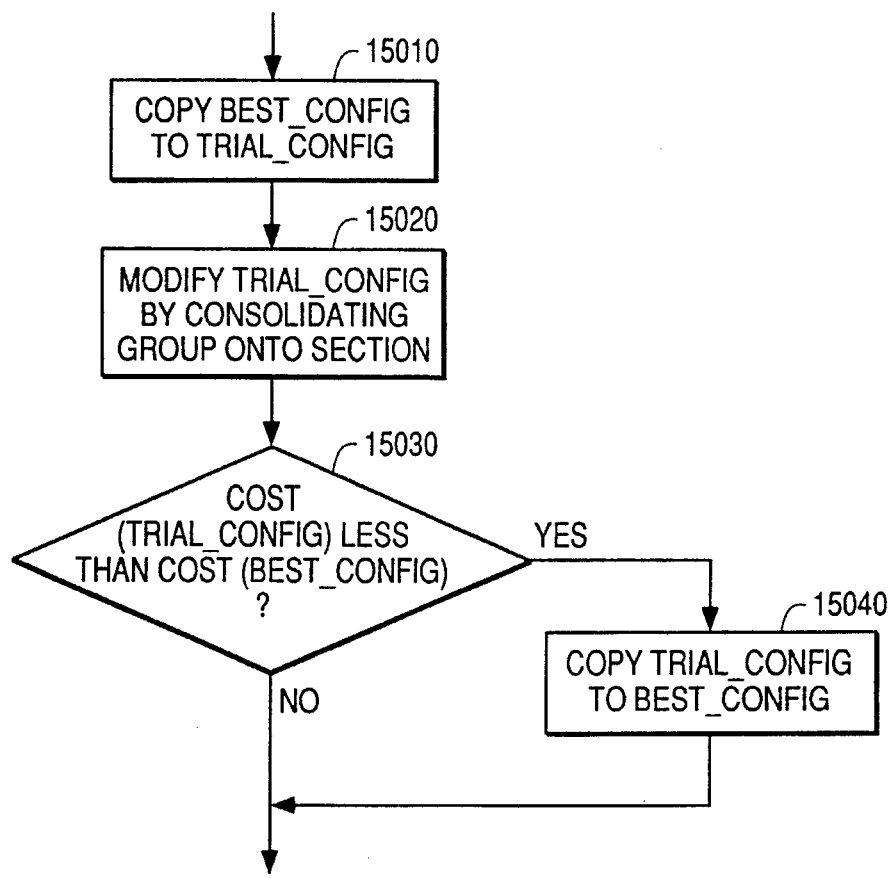
FIG. 15 is a flowchart illustrating one of the steps of FIG. 13.

FIG. 15 is a flowchart illustrating Step 13015 of FIG. 13 in more detail. BEST_CONFIG and TRIAL$_{13}$CONFIG are data structures used to store system configurations. Each of these data structures is accessed using a station address, and has a value for each station address equal to the ethernet section number of the corresponding station. At or before Step 13003 in FIG. 13, BEST$_{13}$CONFIG is set equal to a value corresponding to the actual configuration of the communication system.

First, BEST$_{13}$CONFIG is copied to TRIAL_CONFIG (Step 15010). TRIAL_CONFIG is modified to assign the currently selected group onto the currently selected ethernet section, as determined by other processing in FIG. 13. (Step 15020). Next, the "COST" of TRIAL_CONFIG is compared to the COST of BEST$_{13}$CONFIG (Step 15030). If the COST of TRIAL$_{13}$CONFIG is less than that of BEST_CONFIG, TRIAL_CONFIG is copied to BEST$_{13}$CONFIG (Step 15040). The COST function is discussed in detail below.

Figure 16:
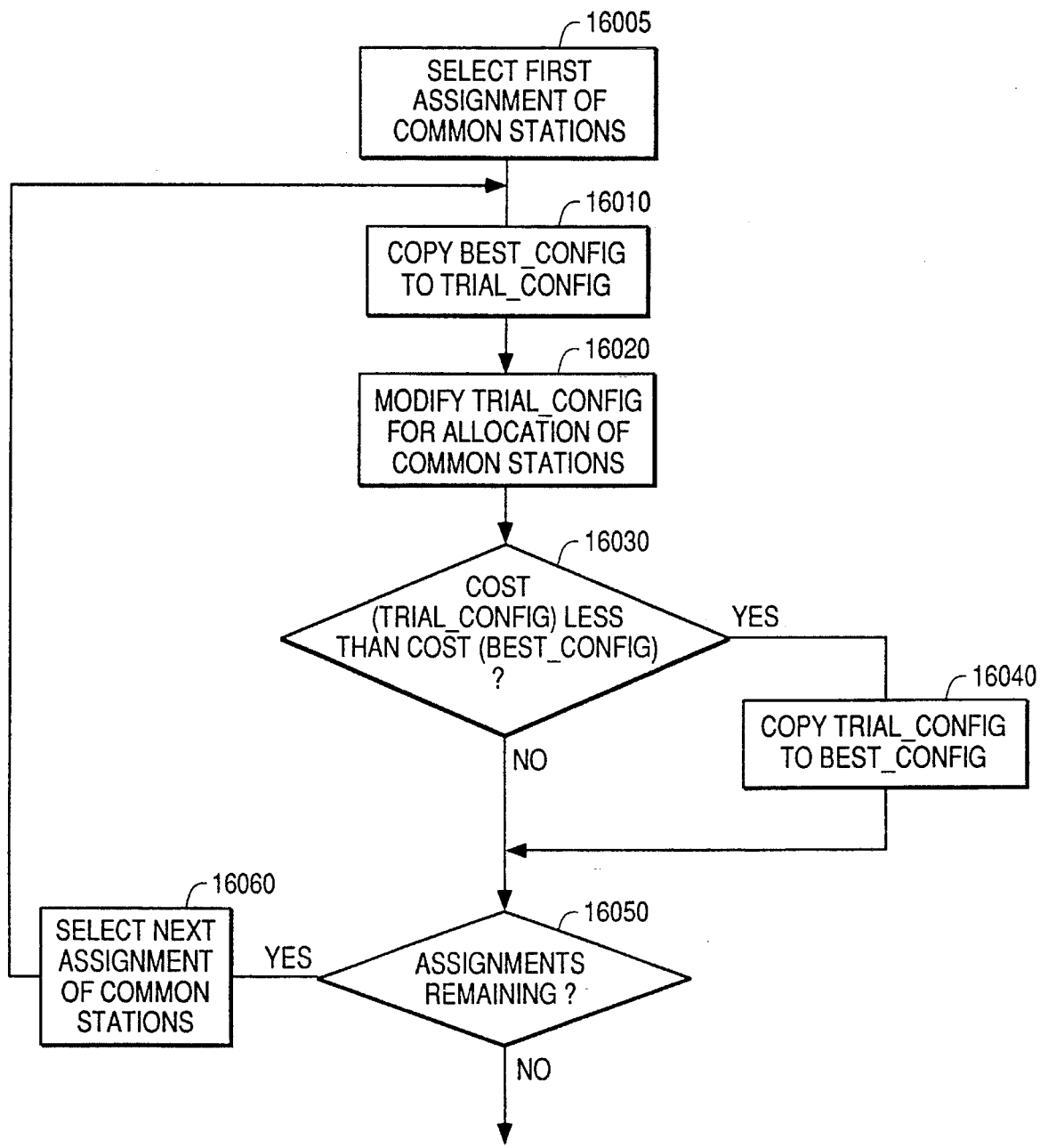
FIG. 16 is a flowchart illustrating one of the steps of FIG. 13.

FIG. 16 is a flowchart illustrating Step 13035 of FIG. 13 in more detail. The method of FIG. 16 evaluates each possible assignment of common stations to ethernet sections of groups to which the common stations are members. First, an initial assignment of common stations among ethernet sections is selected. (Step 16005). BEST$_{13}$CONFIG is copied to TRIAL_CONFIG (Step 16010). TRIAL_CONFIG is modified to conform to the currently selected assignment of common stations to ethernet sections. (Step 16020). Next, the "COST" of TRIAL_CONFIG is compared to the COST of BEST$_{13}$CONFIG (Step 16030). If the COST of TRIAL_CONFIG is less than that of BEST_CONFIG then TRIAL$_{13}$CONFIG is copied to BEST$_{13}$CONFIG (Step 16040). It is determined if other possible assignments have not been yet evaluated (Step 16050). If assignments remain (Step 16060), the next assignment is selected (Step 16060) and control passes to Step 16010.

Optimizations will readily occur to those skilled in the art. For example in Step 15030 of FIG. 15 and Step 16030 of FIG. 16 the COST for BEST_CONFIG need not be calculated each time these steps are executed. Instead, the COST for BEST$_{13}$CONFIG need only be evaluated, and then stored, when BEST$_{13}$CONFIG changes. The stored value could then be read in Steps 15030 and 16030.

Figure 17:
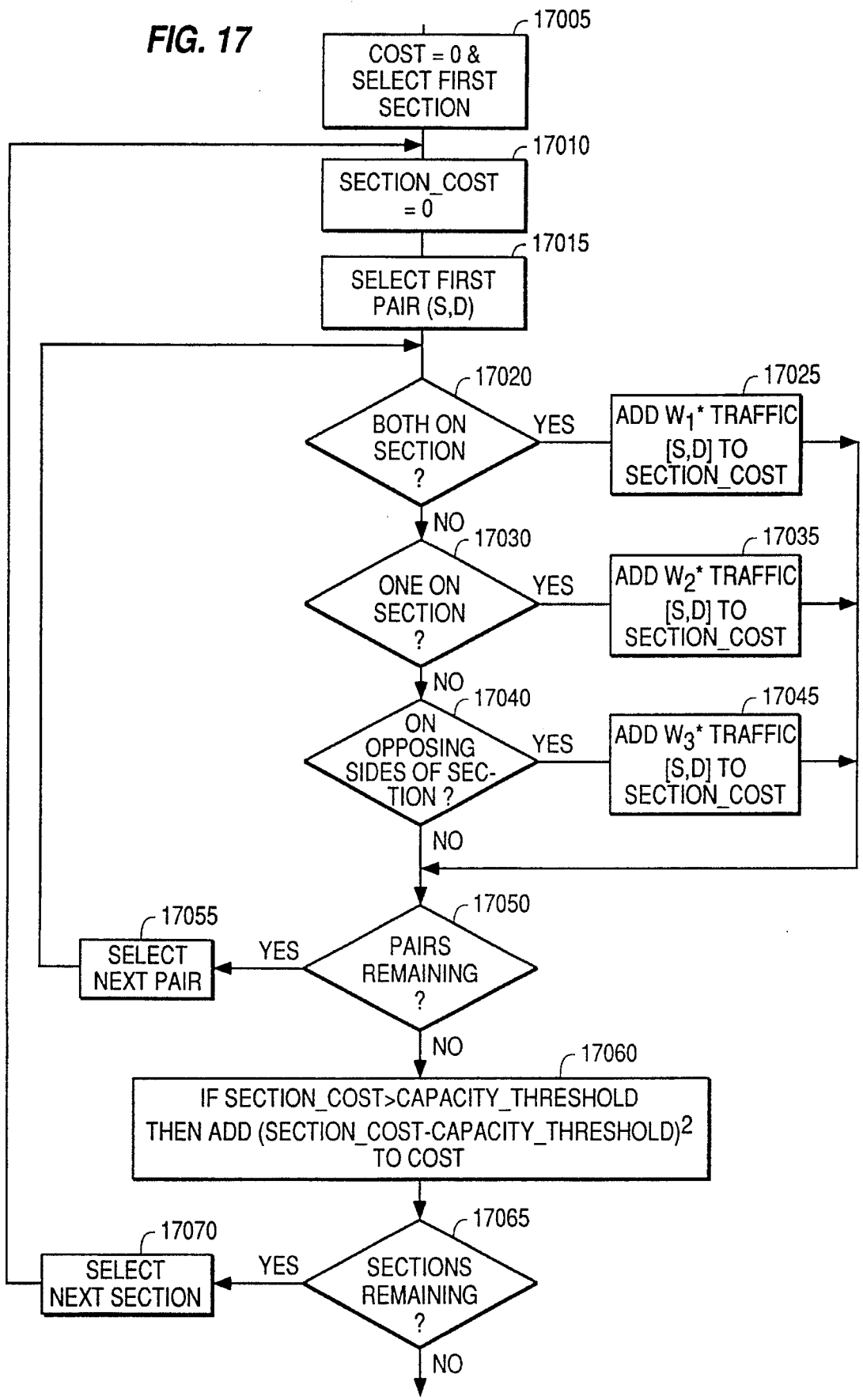
FIG. 17 is a flowchart illustrating a method of determining COST.

FIG. 17 is a flowchart illustrating the calculating of COST, as used in FIGS. 15 and 16, in detail. COST is a sum of the square of different terms, each term have a value corresponding to the traffic for a particular ethernet section:

COST=SECTION_1_TERM$^2$+SECTION_2_TERM$^2$+SECTION_3_TERM$^2$+ . . . SECTION_8_TERM$^2$

First, a COST is set to 0 and the first section is selected (Step 17005). The SECTION$_{13}$COST is set to 0 (Step 17010). The method considers all pairs of stations by first selecting a first pair of stations S and D (Step 17015). If both S and D are on the currently selected section (Step 17020), the traffic between S and D is multiplied by a weight $W_1$ and added to SECTION$_{13}$COST. (Step 17025) Note that the traffic between S and D is recorded in the traffic matrix 12000. If only one of the pair of stations is on the currently selected ethernet section (Step 17030), the traffic between the two stations is multiplied by a weight $W_2$ and added to $SECTION_{13}COST$. (Step 17035) If neither station is on the currently selected section but the stations are on opposite sides of the currently selected section such that traffic between the stations passes through the currently selected section (Step 17040), the traffic between the stations is multiplied by a weight $W_3$ and added to $SECTION_{13}COST$. (STEP 17045)

Typically, $W_2$ will be greater than $W_1$ to account for additional bridge traffic that results from one of the stations being off the current section. Similarly, $W_3$ is greater than $W_2$ to account for bridge traffic coming onto the section as well as bridge traffic leaving the section as the result of a station on one side of the section sending a packet to a station on the other side of the section.

If there are pairs of stations remaining to be processed (Step 17050), the next pair is selected (Step 17055) and control passes to Step 17020. If all pairs have been processed and $SECTION_{13}COST$ is greater than a capacity threshold, an amount of traffic above which substantial performance degradation results, the square of the difference between $SECTION_{13}COST$ and the capacity threshold is added to the COST (Step 17060). If there are sections remaining to be processed (Step 17065), the next section is selected (Step 17070) and control passes to Step 17010.

The preceding method illustrates some general principles of allocating stations among ethernet sections. It is contemplated that in actual practice a method would be tailored to the characteristics of system traffic of the particular system to be configured. Variations in the preceding method will be apparent to those skilled in the art given the pattern of communication traffic for the system to be configured. For example, to reduce the amount of common station processing, Step 14030 of FIG. 14 could eliminate from a set servees that are common stations and that have a certain amount of traffic with the destination station of the set, at times when the certain amount of traffic is less than the amount of traffic between the common station and the destination station of another set, and also is less than a threshold amount. In general, those skilled in the art would use similar techniques to limit the number of iterations through nested loops to reduce the amount of processing required when using the method.

In addition, it is contemplated that the preceding method can be augmented with additional loops to provide for an adaptive algorithm. For example, if Steps 13003–13060 were executed without any change in the configuration, control could pass to Step 13003 again using different thresholds, or to a completely different algorithm, so that a different assignment of stations to groups will be performed in Step 13003.

In other words, the setting means may include multiple rules sets. Each rules set contains a method for assigning a collection of stations into groups. The setting means also includes first means for selecting one of the rules sets; second means for assigning the collection of stations into groups using the selected rules set; third means for determining, for each group processed by the previous step, whether the group should be moved to a common one of the networks; and means for activating the first, second, and third means until an efficient distribution of stations among networks is determined, or until every rules set has been used.

It may also be desirable to process ports having multiple stations, because the 10BASET standard allows multiple stations to be associated with a single port. In general, each port may go through a repeater to another port and to an ethernet section. One way to handle this case is to process the total port traffic, which is equal to the sum of the traffic contributed by each station connected to the port.

If a better alternative has been found, the actual system configuration is changed to match the best configuration evaluated. (Step 9040 in FIG. 9) This involves microprocessor 4710 writing new multiplexor settings to port interface 4250. Update controller 5150 does the actual setting of the multiplexors at a time when both the old and new ethernet sections are inactive.

Figure 18:
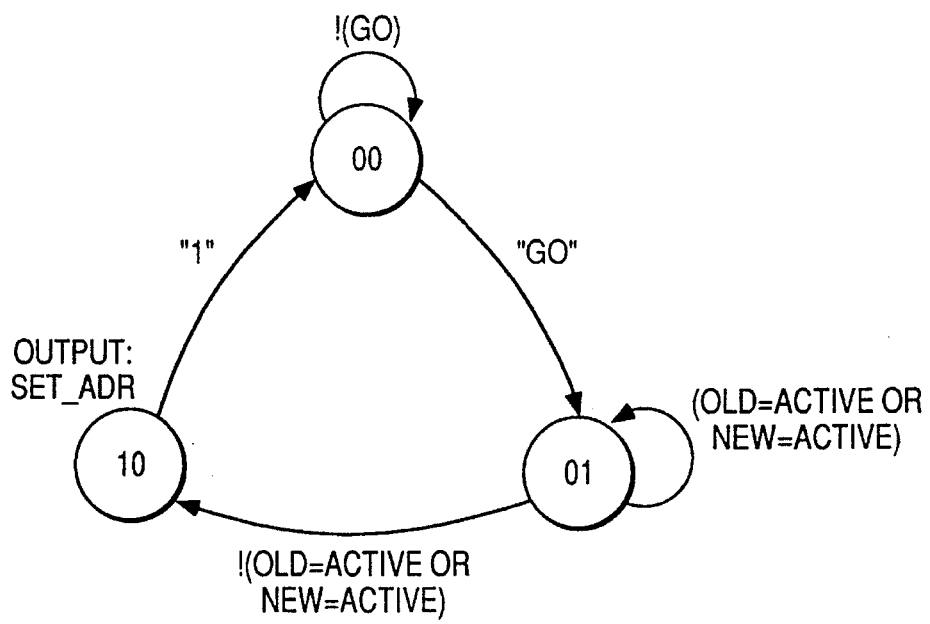
FIG. 18 is a state diagram illustrating one of the steps of FIG. 9.

FIG. 18 is a state diagram illustrating an aspect of step 9040 in detail, the operation of update controller 5150. FIG. 188 should be read in conjunction with FIG. 5. The signal GO causes transition from the 00 to the 01 state. Both the old ethernet section and the new ethernet section must be inactive to cause a transition from the 01 to the 10 state. During the 10 state, which exists for 1 clock period, the output signal SET_ADR is true to set the new address. For convenience, $SET_{13}ADR$ may be simply the left-most state bit. The logic conditions OLD=ACTIVE and NEW=ACTIVE are implemented by logic on $RCV_{13}TH$ outputs.

Topology of Second Preferred Embodiment

Figure 19:
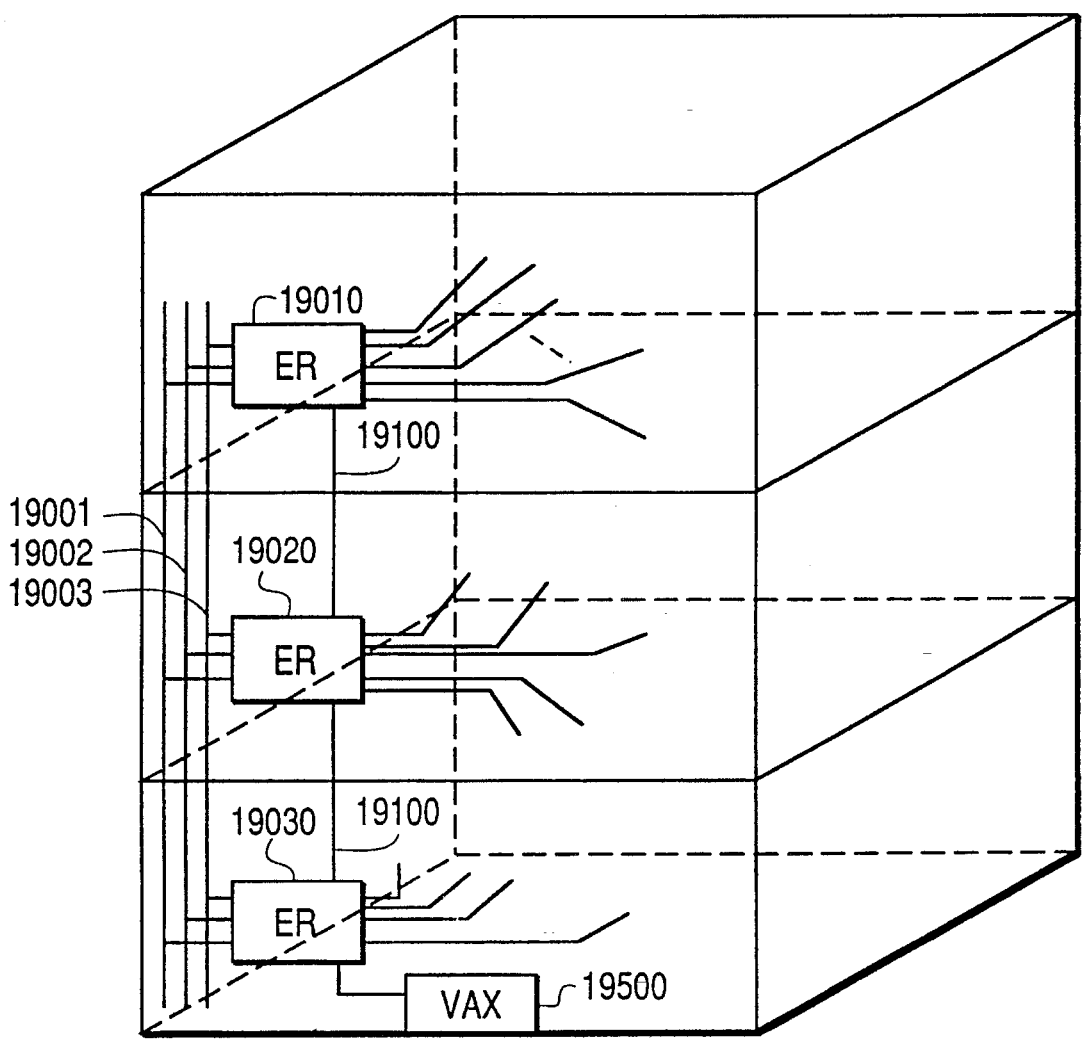
FIG. 19 is a diagram of a building configuration according to a preferred embodiment of the present invention.

FIG. 19 is a diagram illustrating a typical building configuration that might be employed with the self-configuring communication system of the second preferred embodiment. There are equipment rooms 19010, 19020, and 19030 on each floor. Each equipment room contains a composite multiplexor. The composite multiplexors determine the communication history, as in the first preferred embodiment. A mainframe computer, such as VAX 19500, on one of the floors receives the communication history from each composite multiplexor through communication path 19100. After receiving the communication histories, VAX 19500 performs the traffic analysis to determine how each composite multiplexor should be set up, and then sends setup information to each composite multiplexor through communication path 19100.

Although communication path 19100 is shown separate from ethernet backbones 19001–19003, it may be convenient to implement communication path 19100 using the ethernet system of the preferred embodiments. Thus, it may be convenient for the composite multiplexors to themselves have system addresses.

Figure 20:
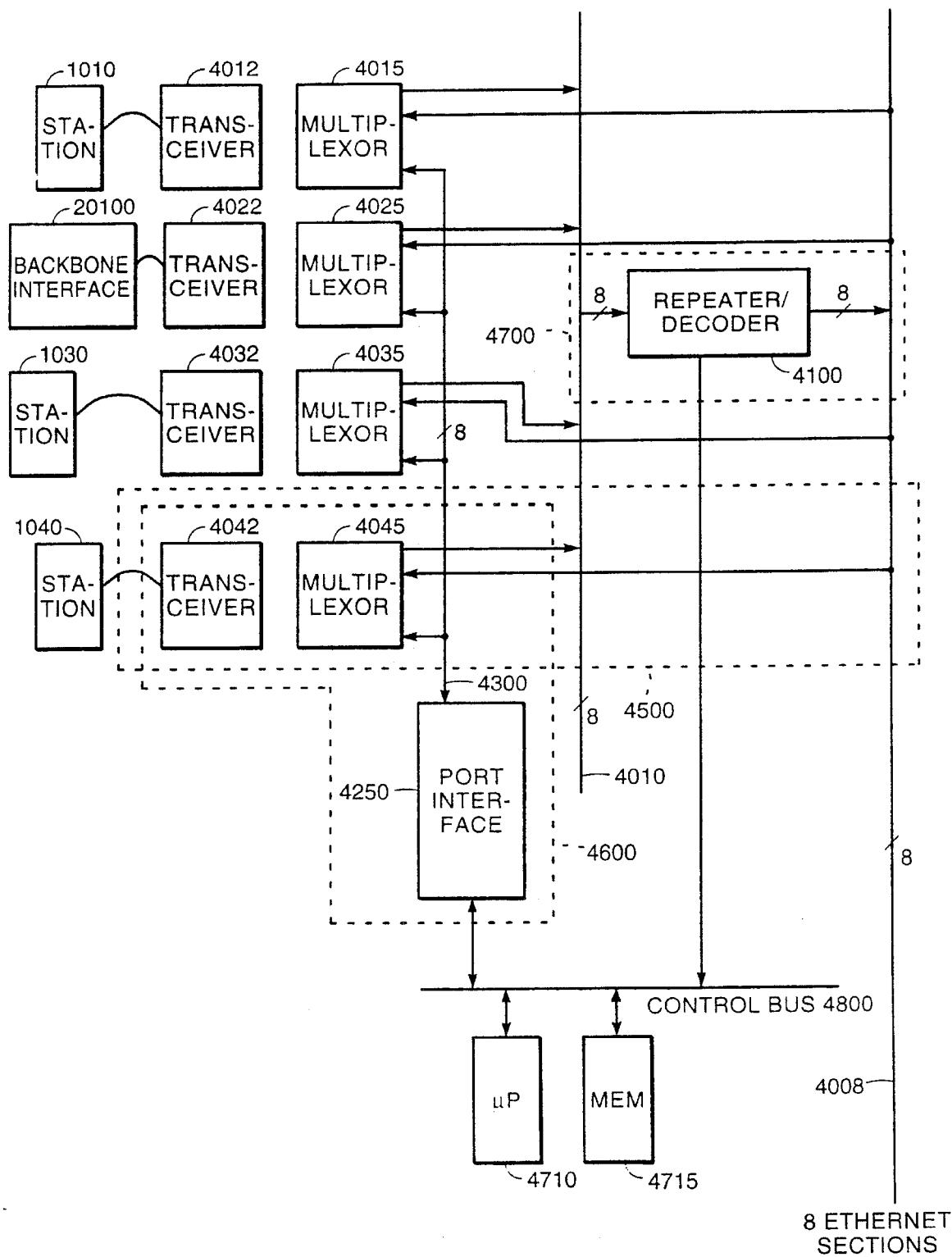
FIG. 20 is a block diagram illustrating a topology of one floor of the building configuration of FIG. 19.

FIG. 20 is a block diagram illustrating a topology of a self-configuring communication system according to the second preferred embodiment of the present invention. FIG. 20 corresponds to FIG. 4, except that instead of port 2 being connected to a station, the port is connected to an ethernet backbone through backbone interface 20100. Thus, port 2 is a port having multiple stations, as described earlier.

In other words, the connecting means includes a first composite multiplexor for connecting some of the stations to one of the networks, and a second composite multiplexor for connecting others of the plurality of stations to one of the networks. The composite multiplexors also include means for determining local communication histories. The setting means includes a processor, physically removed from at least one of the composite multiplexors and responsive to the local communication histories, for setting the first and second composite multiplexors to distribute stations among the networks.

Operation of Second Preferred Embodiment

The method of assigning the stations into groups in the second preferred embodiment is similar to the method of the first preferred embodiment. However, there are potentially more stations for which traffic is analyzed because stations are associated with multiple composite multiplexors. The second preferred embodiment further includes a method of associating each station with a composite port number, as well as a port number within the associated composite multiplexor. This extra association is necessary to enable the VAX 19500 to connect each station to an appropriate ethernet section after communication traffic has been analyzed.

One advantage of the second preferred embodiment is that centralized switching of the multiplexors avoids problems that might be incurred with having multiple composite multiplexors operating asynchronously in the same system. For example, one composite multiplexor may switch a station to a certain ethernet section based on conditions that will not be present after the switch occurs because a different composite multiplexor has changed its station assignment. Another advantage of the second preferred embodiment is that VAX 19500 can be a powerful mainframe computer, allowing more elaborate analysis of the traffic flow.

Conclusion

Thus, with the self-configuring communication system of the preferred embodiment, each station can be automatically assigned to a ethernet section without manual intervention.

Additional details will readily occur to those skilled in the art. For example, since the traffic matrix described above is a sparse matrix, a memory management scheme other than a straight forward address calculation using the 48 bit system addresses should be employed.

Additional advantages and modifications will readily occur to those skilled in the art. The invention in its broader aspects is therefore not limited to the specific details, representative apparatus, and illustrative examples shown and described. For example, although the preferred embodiments employed twisted pair connections, the invention can be implemented with coaxial cable connections.

Thus, various modifications and variations can be made to the present invention without departing from the scope or spirit of the invention, and it is intended that the present invention cover the modifications and variations provided they come within the scope of the appended claims and their equivalents.

We claim:

1. A controller for a communication system having a plurality of networks and a plurality of stations communicating with each other by sending messages from a source station to a destination station, comprising:

means for connecting each station to one of the networks;

means for determining a communication history for selected ones of the plurality of stations corresponding to the messages communicated, the communication history corresponding to a series of packets, each packet having a source address of a station transmitting the packet and a destination address of a station receiving the packet;

means, responsive to said communication history, for evaluating alternative configurations of stations to obtain a best alternative configuration; and, means, responsive to said means for evaluating alternative configurations, for setting the connecting means to connect each of the stations to a selected network, wherein stations with most communication among themselves tend to be assigned to a common network.

2. The controller of claim 1, wherein each station has a system address, and the determining means includes address generating means, responsive to a packet, for generating the source system address and destination system address of the packet; and processor means, responsive to the address generating means, for processing the source system address and destination system address.

3. The controller of claim 1, wherein in the communication system each network respectively includes a network data bus for carrying a packet, and a network status bus for indicating whether a packet is being sent over the network data bus, wherein the means for connecting includes a plurality of ports, each port including a transceiver, coupled to a station, including means for generating a first signal indicating that the station is sending a packet;

means, coupled to the station, for sending the packet to one of the network data busses;

means, coupled to the first signal, for applying a current I to one of the network status busses.

4. The controller of claim 3, wherein in the communication system one of the network status bus has an impedance R, wherein each port further includes means, selectively responsive to one of the network data busses, for applying the packet carried on the network data bus to the transceiver;

means, selectively responsive to the one of the network status busses, for applying a first signal to the transceiver in accordance with a first positive voltage on the one of the network status busses less than or equal to IxR; and means, selectively responsive to one of the network status busses, for applying a second signal to the transceiver in accordance with a second voltage on the one of the network status busses being substantially greater than IxR, and the transceiver further includes means for selectively sending the packet to the station in accordance with the first and second signals.

5. The controller of claim 1, wherein in the communication system each station has a system address, the communication history corresponds to a series of packets, each packet having a source system address of a station transmitting the packet, wherein the setting means includes address generating means, responsive to a packet, for generating the source system address of the packet;

port interface means including a plurality of lines each corresponding to one of the networks, respectively, a plurality of buffers, each responsive to one of the plurality of lines, respectively, means, responsive to a selected one of the plurality of buffers, for generating the contents of the selected one of the plurality of buffers; and processor means, responsive to the address generating means and to the port interface means, for associating a station with a port;

and wherein the means for connecting includes a plurality of ports, each port having a port number and including means, responsive to a packet, for applying the port number to a selected one of the plurality of lines.

6. The controller of claim 1, wherein the setting means includes a plurality of rules sets, each rules set containing a method for assigning a collection of stations into groups;

first means for selecting one of the rules sets;

second means for assigning the collection of stations into groups using the selected one of the rules sets;

third means for determining whether the group should be moved to a common one of the networks;

means for activating the first, second, and third means until a predetermined condition exists.

7. A controller for a communication system having a plurality of networks and a plurality of stations communicating with each other by sending messages from a source station to a destination station, comprising:

means for connecting each station to one of the networks;

means for determining a communication history for the plurality of stations corresponding to the messages communicated, the communication history corresponding to a series of packets, each packet having a source system address of a station transmitting the packet and a destination system address of a station receiving the packet, the determining means includes a matrix, the matrix having rows indexed by source system address and columns indexed by destination system address, for storing a value indicating a quantity of information transferred from each station to each other station;

means for updating the matrix when a packet occurs; and, means for setting the connecting means to connect each of the stations to one network in accordance with the communication history, wherein stations with most communication among themselves tend to be assigned to a common network.

8. A controller for a communication system having a plurality of networks and a plurality of stations communicating with each other by sending messages from a source station to a destination station, comprising:

means for connecting each station to one of the networks;

means for determining a communication history for the plurality of stations corresponding to the messages communicated, the communication history corresponding to a series of packets, each packet having a source system address of a station transmitting the packet and a destination system address of a station receiving the packet;

means for setting the connecting means to connect each of the stations to one network in accordance with the communication history, wherein stations with most communication among themselves tend to be assigned to a common network;

a port for each station, and the setting means includes means for receiving a port number and system address for a station sending a packet;

means for associating the port number with the system address for the station sending the packet; and means, responsive to the associating means, for setting the port.

9. A method of controlling a communication system having a plurality of networks and a plurality of stations communicating with each other by sending messages from a source station to a destination station, each station having a system address, comprising the steps, performed by the communication system, of:

connecting each station to one of the networks, in accordance with a control signal;

determining a communication history for the plurality of stations corresponding to the messages communicated including the substep of monitoring the messages sent on the networks, the communication history corresponds to a series of packets, each packet having a source system address of a station transmitting the packet and a destination system address of a station receiving the packet;

evaluating alternative configurations of stations in response to said communication history; and, generating the control signal to connect each of the stations to a selected network in accordance with the evaluating alternative configurations of stations, wherein the control signal tends to assign stations with the most communication among themselves to a common network.

10. The method of claim 9, wherein in the communication system each station is coupled to a port having a transceiver, and each network respectively includes a network data bus for carrying a packet, and a network status bus for indicating whether a packet is being sent over the network data bus, further including the steps, performed when a station sends a packet, of sending the packet to one of the network data busses; and applying a current I to one of the network status busses.

11. The method of claim 10, wherein in the communication system one of the network status bus has an impedance R, further including the steps of applying, in response to one of the network data busses, the packet carried on the network data bus to a second transceiver of a second station;

applying, in response to the one of the network status busses, a first signal to the second transceiver in accordance with a first positive voltage on the one of the network status busses being less than or equal to IxR;

applying, in response to one of the network status busses, a second signal to the second transceiver in accordance with a second voltage on the one of the network status busses being substantially greater than IxR; and selectively sending the packet to the second station in accordance with the first and second signals.

12. The method of claim 9, wherein the communication system includes a port interface means including a plurality of lines each corresponding to one of the networks, respectively, a plurality of buffers, each responsive to one of the plurality of lines, respectively, in the communication system each station has a system address, the communication history corresponds to a series of packets, each packet having a source system address of a station transmitting the packet, and wherein connecting each station to one of the networks is done by a means for connecting includes a plurality of ports, each port having a port number, wherein the step of generating the control signal includes the substeps of a first step of generating, responsive to a packet, the source system address of the packet;

a second step of generating, responsive to a selected one of the plurality of buffers, the contents of the selected one of the plurality of buffers;

associating, responsive to the first generating step and to the second generating step, a station with a port; and applying responsive to a packet, a port number to a selected one of the plurality of lines.

13. The method of claim 9, wherein the step of generating the control signal includes the substeps of a first step of selecting one of a plurality of rules sets, each rules set containing a method for assigning a collection of stations into groups;

a second step of assigning the collection of stations into groups using the selected one of the rules sets;

a third step of determining whether the group should be moved to a common one of the networks;

performing the first, second, and third steps until a predetermined condition exists.

14. The method of claim 9, wherein the connecting step includes the substeps connecting some of the plurality of stations to one of the networks; and connecting others of the plurality of stations to one of the networks, wherein the determining step includes the substep determining, at a location physically removed from the performance of the step of generating the control signal, part of the communication history of the plurality of stations, and wherein the step of generating the control signal includes the substep of setting, responsive to the step of determining part of the communication history, connection information to distribute stations among the networks for efficient performance of the communication system.

15. A method of controlling a communication system having a plurality of networks and a plurality of stations communicating with each other by sending messages from a source station to a destination station, each station having a system address, comprising the steps, performed by the communication system, of:

connecting each station to one of the networks, in accordance with a control signal;

determining a communication history for the plurality of stations corresponding to the messages communicated including the substep of monitoring the messages sent on the networks, the communication history corresponds to a series of packets, each packet having a source system address of a station transmitting the packet and a destination system address of a station receiving the packet; and generating the control signal to connect each of the stations to one network in accordance with the communication history, wherein the control signal tends to assign stations with the most communication among themselves to a common network; and, updating, by said determining step a matrix when a packet occurs, the matrix having rows indexed by source system address and columns indexed by destination system address, for storing a value indicating a quantity of information transferred from each station to each other station.

16. A method of controlling a communication system having a plurality of networks and a plurality of stations communicating with each other by sending messages from a source station to a destination station, each station having a system address, comprising the steps, performed by the communication system, of:

connecting each station to one of the networks, in accordance with a control signal;

determining a communication history for the plurality of stations corresponding to the messages communicated including the substep of monitoring the messages sent on the networks, the communication history corresponds to a series of packets, each packet having a source system address of a station transmitting the packet and a destination system address of a station receiving the packet; and generating the control signal to connect each of the stations to one network in accordance with the communication history, wherein the control signal tends to assign stations with the most communication among themselves to a common network; and, receiving a port number, where said communication system includes a port for each station, and a system address for a station sending a packet;

associating the port number with the system address for the station sending the packet; and setting, responsive to the associating step, the station sending a packet for connection to the one network.

17. In a communication system having a plurality of networks and a plurality of stations communicating with each other by sending messages from a source station to a destination station, a method of distributing stations among networks, comprising the steps of:

assigning the stations to a set of groups of stations such that each station is assigned to at least one group, including the substep of determining initial sets of stations: each set including a destination station receiving from multiple source stations, and the corresponding multiple source stations;

computing a cost for message traffic, where the cost is computed in response to message traffic between pairs of stations;

processing a group in the set of groups including the substeps, performed for each network, of assigning all stations of the group onto a network if a lower cost, responsive to the computing a cost, would result; and reassigning those stations of the group that are common to multiple groups among the networks if a lower cost would result.

18. The method of claim 17, further including the substeps, performed for each initial set, of condensing the initial set by eliminating source stations that are also destination stations in a larger initial set.

19. The method of claim 17, further including the substeps, performed for each initial set, of condensing the initial set by eliminating source stations common to multiple initial sets and having a certain amount of traffic with the destination station of the initial set, when the certain amount is less than an amount of traffic with the destination station of another initial set and less than a threshold amount.

* * * * *